(12) United States Patent
Ham et al.

(10) Patent No.: US 9,543,046 B2
(45) Date of Patent: Jan. 10, 2017

(54) DETECTING PIN DIVERSION FROM PRESSURIZED WATER REACTORS SPENT FUEL ASSEMBLIES

(75) Inventors: Young S. Ham, Dublin, VA (US); Shivakumar Sitaraman, San Jose, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1150 days.

(21) Appl. No.: 12/619,791

(22) Filed: Nov. 17, 2009

(65) Prior Publication Data

US 2011/0026661 A1    Feb. 3, 2011

Related U.S. Application Data

(60) Provisional application No. 61/230,544, filed on Jul. 31, 2009.

(51) Int. Cl.
*G21C 17/06*      (2006.01)

(52) U.S. Cl.
CPC ...................... *G21C 17/06* (2013.01)

(58) Field of Classification Search
CPC ............................................. G21C 17/06
USPC .................... 376/450; 250/265, 264
See application file for complete search history.

(56) References Cited

U.S. PATENT DOCUMENTS

| | | | |
|---|---|---|---|
| 3,629,062 A * | 12/1971 | Muenchow | G21C 15/12 376/271 |
| 4,335,466 A * | 6/1982 | Lee | 376/257 |
| 4,389,568 A | 6/1983 | Dowdy et al. | |
| 4,772,446 A * | 9/1988 | Meuschke | 376/262 |
| 6,035,010 A * | 3/2000 | George et al. | 376/257 |
| 7,514,695 B2 | 4/2009 | Caffrey | |
| 2006/0056573 A1* | 3/2006 | McGregor et al. | 376/434 |
| 2009/0046824 A1* | 2/2009 | Pomirleanu et al. | 376/236 |

OTHER PUBLICATIONS

Spent Fuel Storage in Pools and Dry Casks: Key Points and Questions & Answers. available online: <http://www.nrc.gov/waste/spent-fuel-storage/faqs.html>.*

(Continued)

*Primary Examiner* — Jack W Keith
*Assistant Examiner* — Lily C Garner
(74) *Attorney, Agent, or Firm* — Eddie E. Scott

(57) ABSTRACT

Detecting diversion of spent fuel from Pressurized Water Reactors (PWR) by determining possible diversion including the steps of providing a detector cluster containing gamma ray and neutron detectors, inserting the detector cluster containing the gamma ray and neutron detectors into the spent fuel assembly through the guide tube holes in the spent fuel assembly, measuring gamma ray and neutron radiation responses of the gamma ray and neutron detectors in the guide tube holes, processing the gamma ray and neutron radiation responses at the guide tube locations by normalizing them to the maximum value among each set of responses and taking the ratio of the gamma ray and neutron responses at the guide tube locations and normalizing the ratios to the maximum value among them and producing three signatures, gamma, neutron, and gamma-neutron ratio, based on these normalized values, and producing an output that consists of these signatures that can indicate possible diversion of the pins from the spent fuel assembly.

16 Claims, 22 Drawing Sheets

(56) References Cited

OTHER PUBLICATIONS

Ham, Y. S., and S. Sitaraman. Development of a safeguards verification method and instrument to detect pin diversion from pressurized water reactor (PWR) spent fuel assemblies phase I study. LLNL-TR-409660, Sep. 2008. Available online: <https://e-reports-ext.llnl.gov/pdf/368730.pdf>.*

Sitaraman, Shivakumar, and Young S. Ham. UCRL-PRES-232460: "Characterization of a Safeguards Verification Methodology to Detect Pin Diversion from Pressurized Water Reactor (PWR) Spent Fuel Assemblies using Monte Carlo Techniques." Presented at the 48th Annual Meeting of the Institute of Nuclear Materials Management, Tucson, Arizona. Jul. 2007.*

Ham, Y. S. et al., "Monte Carlo Characterization of Pressurized Water Reactor Spent Fuel Assembly for the Development of a New Instrument for Pin Diversion Detection," INMM06, Nashville, TN, Jul. 16, 2006 through Jul. 20, 2006.

Ham, Y. S. et al, "Development of a Safeguards Verification Method and Instrument to Detect Pin Diversion from Pressurized Water Reactor (PWR) Spent Fuel Assemblies," Symposium on International Safeguards, Vienna, Austria, Oct. 16, 2006 through Oct. 20, 2006.

Sitaraman, S. et al, "Characterization of a Safeguards Verification Methodology to Detect Pin Diversion from Pressurized Water Reactor (PWR) Spent Fuel Assemblies Using Monte Carlo Techniques", INMM Annual Meeting, Tucson, AZ, Jul. 8, 2007 through Jul. 12, 2007.

Sitaraman, S. et al, "Sensitivity Studies for an In-Situ Partial Defect Detector (PDET) in Spent Fuel Using Monte Carlo Techniques", INMM-49$^{th}$ Annual Meeting, Nashville, TN, Jul. 13, 2008 through Jul. 17, 2008.

Sitaraman, Shivakumar et al, Symmetric Pin Diversion Detection using a Partial Defect Detector (PDET), Tucson, AZ, Jul. 12, 2009 through Jul. 16, 2009.

Walters, W. et al, Methodology and Determination of Field of View of Neutron and Gamma Detectors in the Atucha Spent Fuel Storage Pool, Tucson, AZ, Jul. 12, 2009 through Jul. 16, 2009.

Michael Mellish et al., "Nuclear Denial," Renewable Energy World. com, Sep. 2008.

* cited by examiner

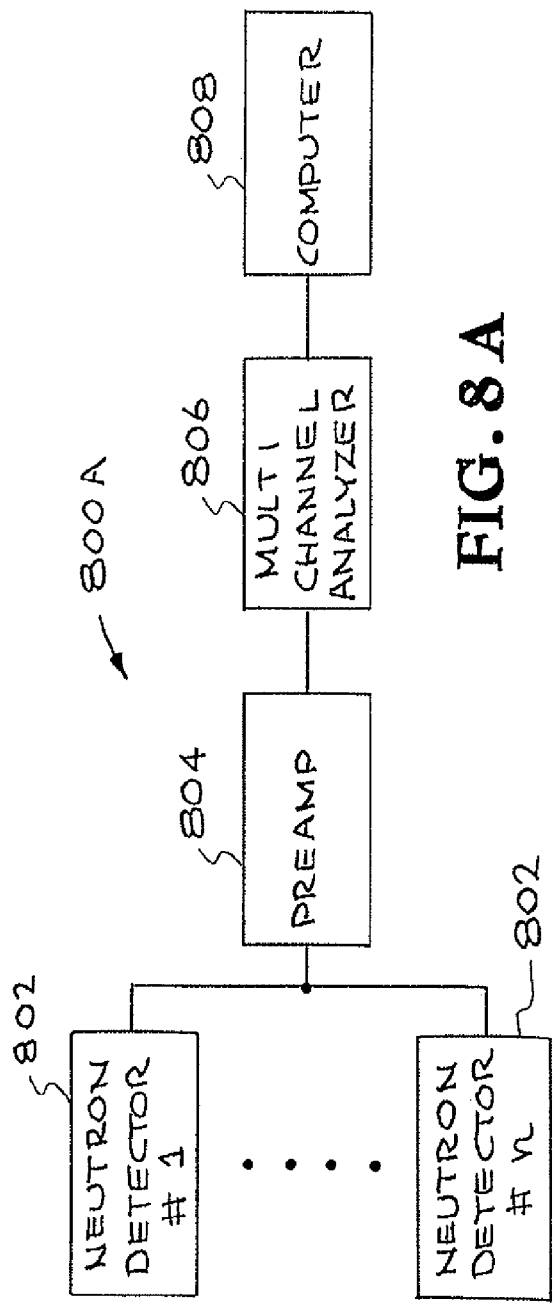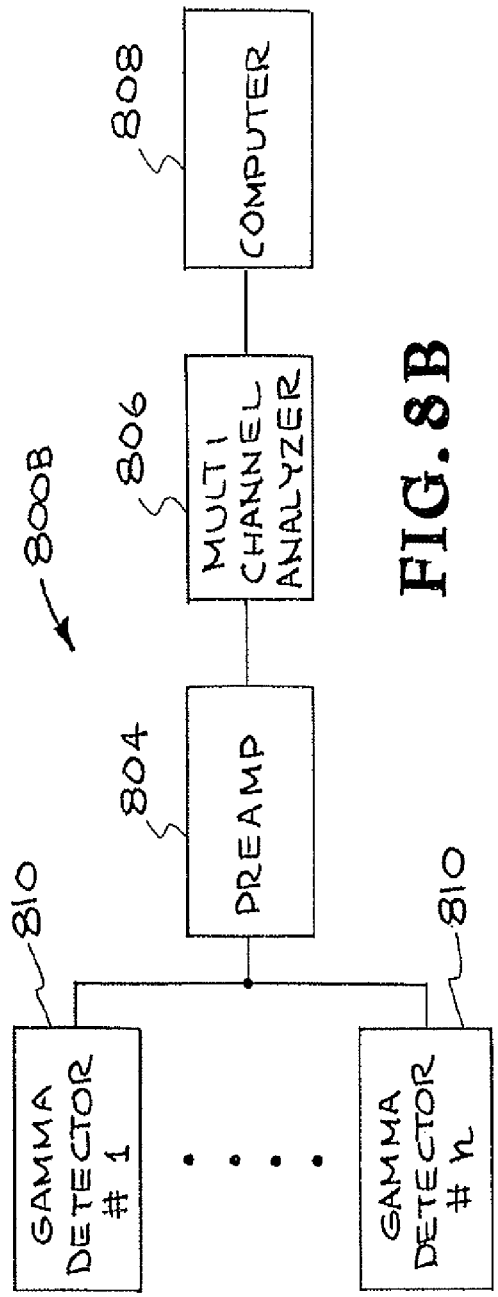

DETECTING PIN DIVERSION FROM PRESSURIZED WATER REACTORS SPENT FUEL ASSEMBLIES

CROSS-REFERENCE TO RELATED APPLICATIONS

The present application claims benefit under 35 U.S.C. §119(e) of U.S. Provisional Patent Application No. 61/230,544 filed Jul. 31, 2009 entitled "Detecting Pin Diversion from Light Water Reactor Spent Fuel Assemblies," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to light water reactor spent fuel assemblies, and more particularly Pressurized Water Reactor (PWR) spent fuel assemblies with both $UO_2$ and mixed oxide (MOX) types of fuel and more particularly to determining whether fuel rods (pins) within PWR spent fuel assemblies are missing or have been replaced with dummy fuel rods.

State of Technology

U.S. Pat. No. 7,514,695 for a detector and method for inspecting a sealed nuclear storage container provides the following state of technology information: "Heretofore, spent nuclear fuel has been placed in fuel storage casks which are typically stored above ground, at various locations in the continental United States. These storage areas are typically in restricted areas, and security is provided to protect the casks from possible tampering or the removal of any spent nuclear fuel. At present, the only indication of possible reactor spent fuel diversion from a storage cask is provided by means of tamper-indicating tags and seals which are provided with each of the storage casks. With the increasing risk of terrorist acts within the United States, and the possibility that spent nuclear fuel sources might by sought after and diverted for possible terrorist acts, a renewed effort has been undertaken to identify means by which spent nuclear fuel storage casks may be readily inspected to determine whether spent nuclear fuel which has been stored within same has been removed improperly from the storage cask."

U.S. Pat. No. 4,389,568 for a method for monitoring irradiated nuclear fuel using Cerenkov radiation provides the following state of technology information: "A method is provided for monitoring irradiated nuclear fuel inventories located in a water-filled storage pond wherein the intensity of the Cerenkov radiation emitted from the water in the vicinity of the nuclear fuel is measured. This intensity is then compared with the expected intensity for nuclear fuel having a corresponding degree of irradiation exposure and time period after removal from a reactor core. Where the nuclear fuel inventory is located in an assembly having fuel pins or rods with intervening voids, the Cerenkov light intensity measurement is taken at selected bright spots corresponding to the water-filled interstices of the assembly in the water storage, the water-filled interstices acting as Cerenkov light channels so as to reduce cross-talk. On-line digital analysis of an analog video signal is possible, or video tapes may be used for later measurement using a video editor and an electrometer. Direct measurement of the Cerenkov radiation intensity also is possible using spot photometers pointed at the assembly."

U.S. Pat. No. 4,335,466 for a method and apparatus for measuring irradiated fuel profiles provides the following state of technology information: "In order to comply with various safeguards agreements, inspection organizations such as NRC (Nuclear Regulatory Commission) and IAEA (International Atomic Energy Agency) need a capability of very quickly and accurately monitoring in a non-destructive manner the fissile content of spent fuel assemblies in storage pools. Presently, measurements of the content of residual and produced fissile material are not directly measured but rather are inferred by measuring particular data which is correlated to burnup (which is a measure of nuclear reactor fuel consumption, expressed either as a percent of fuel atoms that have undergone fission or as the amount of energy produced per unit weight of fuel)."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

A technical safeguards challenge has remained for decades for the International Atomic Energy Agency (IAEA) to identify possible diversion of nuclear fuel pins from Light Water Reactor (LWR) spent fuel assemblies. As modern nuclear power plants are pushed to higher power levels and longer fuel cycles, fuel failures (i.e., "leakers") as well as the corresponding fuel assembly repairs (i.e., "reconstitutions") are commonplace occurrences within the industry. Fuel vendors have performed hundreds of reconstitutions in the past two decades, thus, an evolved know-how and sophisticated tools exist to disassemble irradiated fuel assemblies and replace damaged pins with dummy stainless steel or other type rods. Various attempts have been made in the past two decades to develop a technology to identify a possible diversion of pins and to determine whether some pins are missing or replaced with dummy or fresh fuel pins. However, to date, there are no safeguards instruments that can detect a possible pin diversion scenario to the requirements of the IAEA.

The FORK detector system can characterize spent fuel assemblies using operator declared data, but it is not sensitive enough to detect less than 50% missing pins from spent fuel assemblies. In addition, it requires the fuel to be lifted out of the storage location to perform the measurement. Likewise, an emission computed tomography system has been used to try to detect missing pins from a spent fuel assembly and has shown some potential for identifying possible missing pins but this capability has not yet been fully demonstrated. The use of such a device in the future would not be envisaged, especially in an inexpensive, easy to handle setting for field applications. The Cerenkov viewing device is another instrument used in the field. However, it does not work well for fuel that has been cooled for a long time or low burnup fuel or in murky spent fuel pool conditions. It also has an issue with cases where the pins are missing in a random fashion since neighboring fuel pins of a missing one give off radiation potentially giving a false negative indication.

The present invention provides a system for determining whether some fuel pins within PWR spent fuel assemblies are missing or replaced with dummy fuel pins. The methodology can detect as low as 10% missing fuel without relying on operator provided data or any movement of fuel from its storage location. The method is also extendable to MOX fresh fuel assemblies or MOX spent fuel assemblies. The apparatus is in the form of a cluster which contains multiple neutron detectors and/or gamma detectors. The apparatus is inserted into spent fuel assemblies through the guide tube holes present in the spent fuel assemblies. The radiation responses, gamma and neutron, of the detectors are simultaneously measured at a location or multiple locations within the guide tubes.

The present invention provides methods and apparatus for detecting diversion of spent fuel from PWRs. One embodiment provides a method of determining possible diversion of pins in a PWR spent fuel assembly having guide tube holes, including the steps of providing a detector cluster containing gamma ray detectors, inserting the detector cluster containing the gamma ray detectors into the spent fuel assembly through the guide tube holes in the spent fuel assembly, measuring gamma ray radiation responses of the gamma ray detectors in the guide tube holes, processing the gamma ray radiation responses at the guide tube locations by normalizing them to the maximum value among them and producing a signature based on these normalized values, and producing an output that consists of this signature that can indicate possible diversion of the pins from the spent fuel assembly. Another embodiment provides a method of determining possible diversion of pins in a PWR spent fuel assembly having guide tube holes, including the steps of providing a detector cluster containing neutron detectors, inserting the detector cluster containing the neutron detectors into the spent fuel assembly through the guide tube holes in the spent fuel assembly, measuring neutron radiation responses of the neutron detectors in the guide tube holes, processing the neutron radiation responses at the guide tube locations by normalizing them to the maximum value among them and producing a signature based on these normalized values, and producing an output that consists of this signature that can indicate possible diversion of the pins from the spent fuel assembly. Another embodiment provides a method of determining possible diversion of pins in a PWR spent fuel assembly having guide tube holes, including the steps of providing a detector cluster containing neutron detectors and gamma ray detectors, inserting the detector cluster containing the neutron detectors and the gamma ray detectors into the spent fuel assembly through the guide tube holes in the spent fuel assembly, measuring neutron radiation responses and gamma ray radiation responses of the neutron detectors and the gamma ray detectors, processing the neutron radiation responses and the gamma ray radiation responses of the neutron detectors and the gamma ray detectors and determining whether pins are missing or have been replaced with dummy or fresh pins, and providing an output indicating possible diversion of the pins in the spent fuel assembly.

Another embodiment provides an apparatus for determining whether some fuel pins within PWR spent fuel assemblies are missing or replaced with dummy fuel rods, wherein the spent fuel assemblies have guide tube holes, including a cluster which contains neutron detectors or gamma detectors or neutron detectors and gamma detectors, the cluster inserted into the spent fuel assemblies through the guide tube holes in the spent fuel assemblies; and a measuring and analyzing device, the measuring and analyzing device measuring radiation responses of the detectors simultaneously at a location or multiple locations within the guide tube holes and processing the radiation responses and determining whether pins are missing or have been replaced with dummy or fresh pins.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

In FIG. 7 the guide tubes 404 are shown with letters a thru p. The letters a thru p correspond to detectors that will be inserted into the guides to make measurement. The insertion fixture 200 can be repositioned atop the spent fuel array 108 by rotating it 180°.

FIGS. 8A, 8B, and 8C are schematic representations of three possible arrangements of detectors and the associated apparatus used in collecting and analyzing the data obtained by the system.

DETAILED DESCRIPTION OF SPECIFIC EMBODIMENTS

Figure 1:
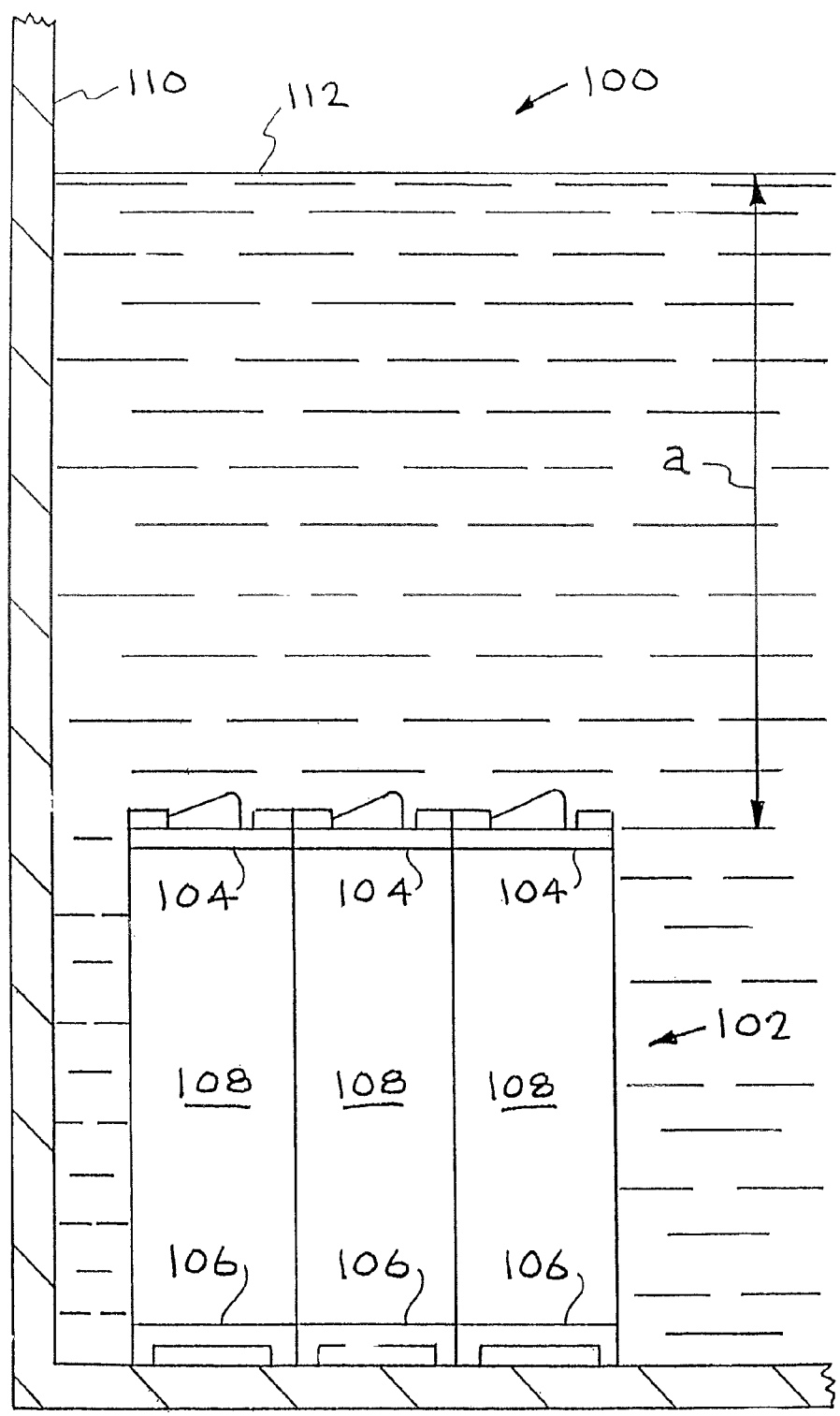
FIG. 1 illustrates a spent fuel storage pool.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a system for detecting diversion of spent fuel from Pressurized Water Reactors (PWR) to address a long unsolved safeguards verification problem for international safeguards community such as the International Atomic Energy Agency (IAEA) or the European Atomic Energy Community (EURATOM). The present invention involves inserting tiny neutron and gamma detectors into the guide tubes of a spent fuel assembly and measuring the signals. The guide tubes form a quadrant symmetric pattern in the various PWR fuel product lines and the neutron and gamma signals from these various locations are processed to obtain a unique signature for an undisturbed fuel assembly. Signatures based on the neutron and gamma signals individually or in a combination can be developed. Removal of fuel pins from the assembly will cause the signatures to be visibly perturbed thus enabling the detection of diversion. All of the required signal processing to obtain signatures can be performed on standard equipment such as laptop computers.

Monte Carlo simulation studies were performed to develop the present invention and a set of controlled experiments with actual commercial PWR spent fuel assemblies were performed to validate the invention. Based on the simulation studies and benchmarking measurements, the methodology developed promises to be a powerful and practical way to detect partial defects that constitute 10% or more of the total active fuel pins. This far exceeds the detection threshold of 50% missing pins from a spent fuel assembly, a threshold defined by the IAEA Safeguards Criteria. The methodology does not rely on any operator provided data like burnup or cooling time and does not require movement of the fuel assembly from the storage rack in the spent fuel pool.

General Introduction to Source Terms

Low enriched fuel such as that used in PWRs emit neutrons and photons (gamma rays) that are dependent on the amount of energy produced by this fuel before it is discharged from the core of the reactor and stored as spent fuel in spent fuel pools or other repositories. The amount of energy produced is referred to as burnup and is typically presented in units of MWd/kg or equivalently, GWd/t. The spent fuel emits neutrons and gammas at levels that depend on the burnup. In the case of neutrons, the number emitted per second from typical PWR spent fuel increases as the third to fourth power of the burnup. For gammas, the source is approximately linear with burnup.

The neutrons in spent fuel come mainly from the spontaneous fission of actinides such as $^{244}$Cm, $^{242}$Cm, and to a lesser extent, the even mass number isotopes of Pu. The production of these actinides increases with burnup. To achieve the same burnup, lower enriched fuel needs to operate at a higher neutron fluence than higher enriched fuel while in the core. Therefore, initial enrichment affects the neutron source. In addition, the cooling time (or the total time since the fuel was discharged from the core) is also a parameter that influences the neutron source. This is because of the relatively short half lives of the two dominant neutron sources, $^{244}$Cm and $^{242}$Cm at 18.1y and 0.45y, respectively. Since $^{242}$Cm decays quickly, the principal source for neutrons is $^{244}$Cm. A much smaller number of neutrons are produced by ($\alpha$, n) neutrons produced in the oxide form of the fuel that is typically used in PWRs.

The gamma source is linear after 1 year of cooling time and principally depends on the amount of $^{137}$Cs. Since the fission yield of this isotope is approximately the same for both $^{235}$U and $^{239}$Pu, the gamma yield is not very sensitive to initial enrichment. $^{137}$Cs has a long half life of 30.2 years and as a result the cooling time is also not much of a factor in the gamma source strength.

PDET Concept

Pressurized water reactors (PWRs) constitute about 60% of operating reactors in the world. A large number of these have fixed designs with a fuel pin matrix interspersed with guide tubes in a regular quadrant symmetric pattern that are used to insert control rods etc. The drawing figures show a fuel assembly with fuel pins and guide tubes. In the spent fuel pool these guide tubes are generally filled with water and present good locations to insert tiny detectors to measure the population of the neutrons and gammas. The neutrons emitted from the fuel pins are at high energies and migrate and slow down (thermalize) in the water in the pool. The thermal neutrons, and to a lesser extent, fast neutrons go on to produce more fission neutrons by interacting with the fissile and fissionable materials inside the spent fuel. This subcritical multiplication within the spent fuel tends to remove some of the severe dependence of the neutron source on burnup. In addition, neighboring assemblies, depending on burnup gradients and cooling times translating into source gradients, would contribute more neutrons potentially further lessening the burnup dependence of the neutron field. The guide tube locations at the center of an assembly see higher neutron signals since there are contributions from more fuel pins at these locations within the assembly than there are at the guide tube locations in the periphery.

The gamma signal is more localized because the gammas are stopped by the high density fuel containing material with high atomic numbers. Gamma signals are also higher at the central locations of guide tubes than at the peripheral locations but the difference much less pronounced than for the neutrons due to the localized nature of the gammas. Contributions to the gamma signal from neighboring assemblies are also small.

Ratios of the two signals would cancel out more of the dependence on burnup and would primarily depend on the location of the guide tubes. Thus this signature can be expected to provide insight into the radiation fields inside the assembly with less dependence on the various parameters that vary, such as burnup levels, cooling times, etc.

Referring now to the drawings and in particular to FIG. 1, a spent fuel storage pool is illustrated. FIG. 1 shows a partial view of a spent fuel storage pool 100. Three spent fuel assemblies 102 are shown in place at the bottom of the pool 100. The spent fuel assemblies 102 consist of three main elements, a top plate 104 and a bottom plate 106 and a fuel pin array 108 retained by top plate 104 and bottom plate 106. The storage pool 100 has a pool liner 110 and the pool is filled with water 112. The spent fuel assemblies 102 are stored at the bottom of the pool and as indicated by dimension labeled "a." The assemblies typically are at least 20 feet beneath the surface of the water in the storage pool.

Figure 2:
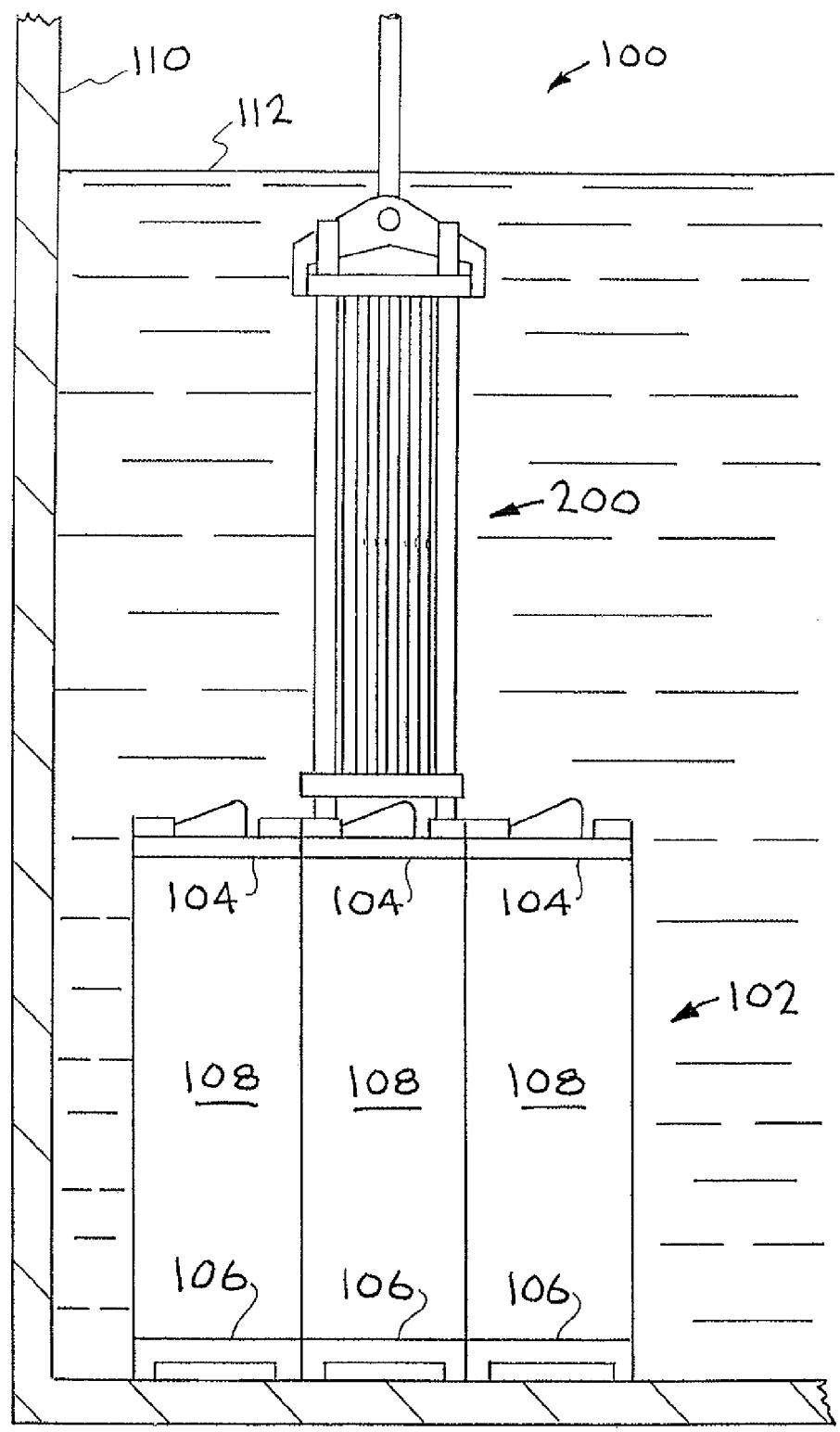
FIG. 2 illustrates the spent fuel storage pool with the addition of an insertion fixture.

Referring now to FIG. 2, the spent fuel storage pool 100 is illustrated with the addition of an insertion fixture 200. FIG. 2 shows the same elements as shown in FIG. 1 with the addition of the insertion fixture 200. The insertion fixture 200 will be shown and explained in greater detail in FIG. 3. The insertion fixture 200 is positioned over the spent fuel assembly 102 that is to be tested by a crane (not shown) that can accurately position the insertion fixture 200 over the desired spent fuel assembly 102. The insertion fixture can then be lowered to engage locating pins into a receptacle on the top plate 104. This will be shown and explained in greater detail in FIG. 4.

Figure 3:
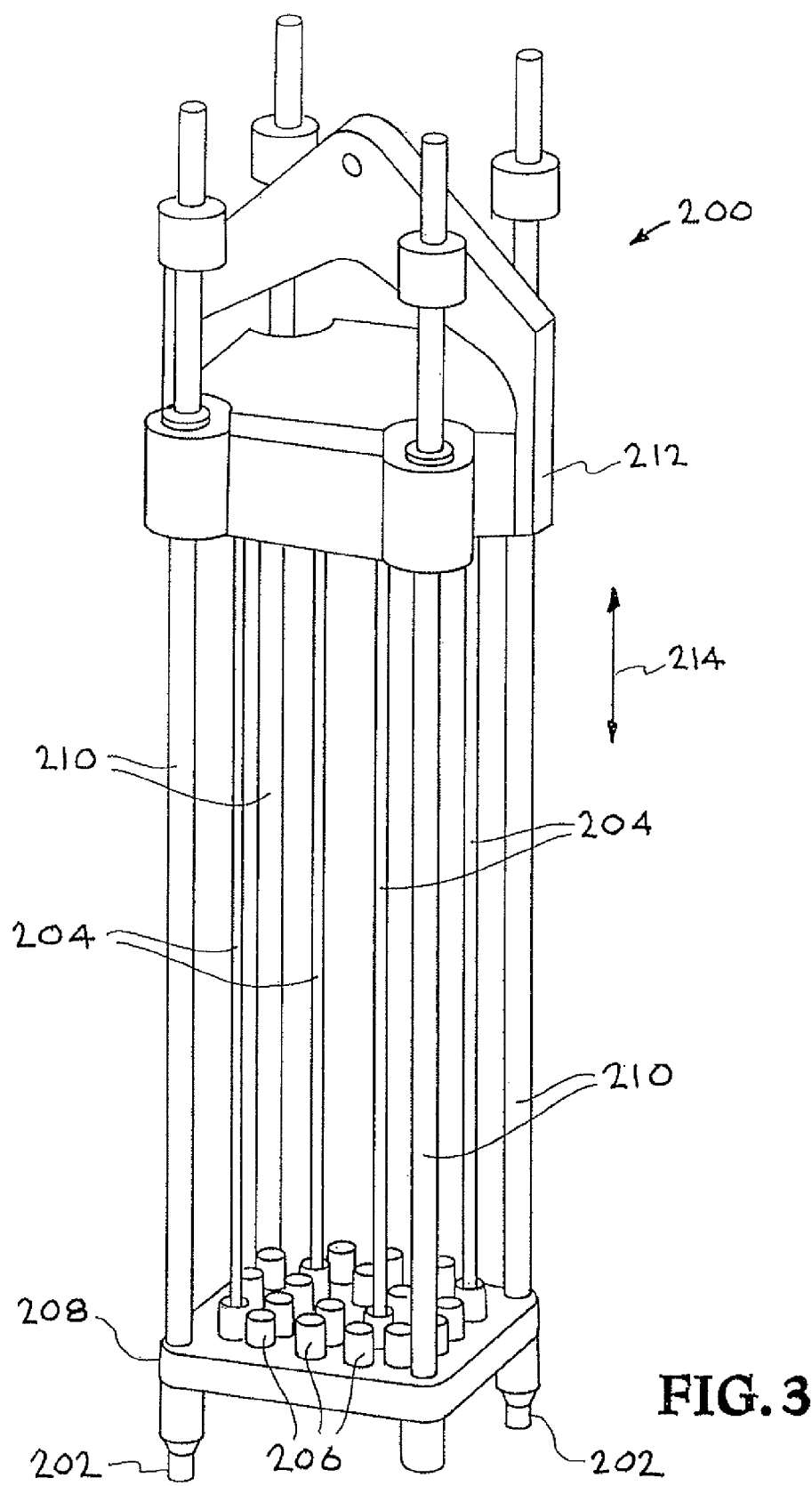
FIG. 3 illustrates the insertion fixture in greater detail.

FIG. 3 is an illustration of the insertion fixture 200. The fixture 200 is comprised of the following elements. There is a bottom plate 208 with an array of guide bushings 206 that will guide the detector rods 204 into the spent fuel array. Protruding from the bottom of plate 208 are guide pins 202. The guide 202 will engage alignment holes in the top plate 104 of spent fuel assembly 102 extending upward from the plate 208 are four slider rods 210. The slider assembly 212 is mounted on the four slider rods 210 and is free to move up and down as indicated by arrow 214.

The detector rods 204 are part of the slider assembly 212 and as the slider assembly 212 is lowered the detector rods 204 will slide thru guide bushings 206 and enter guide tubes (control rod tubes) in the spent fuel pin array 108.

Figure 4:
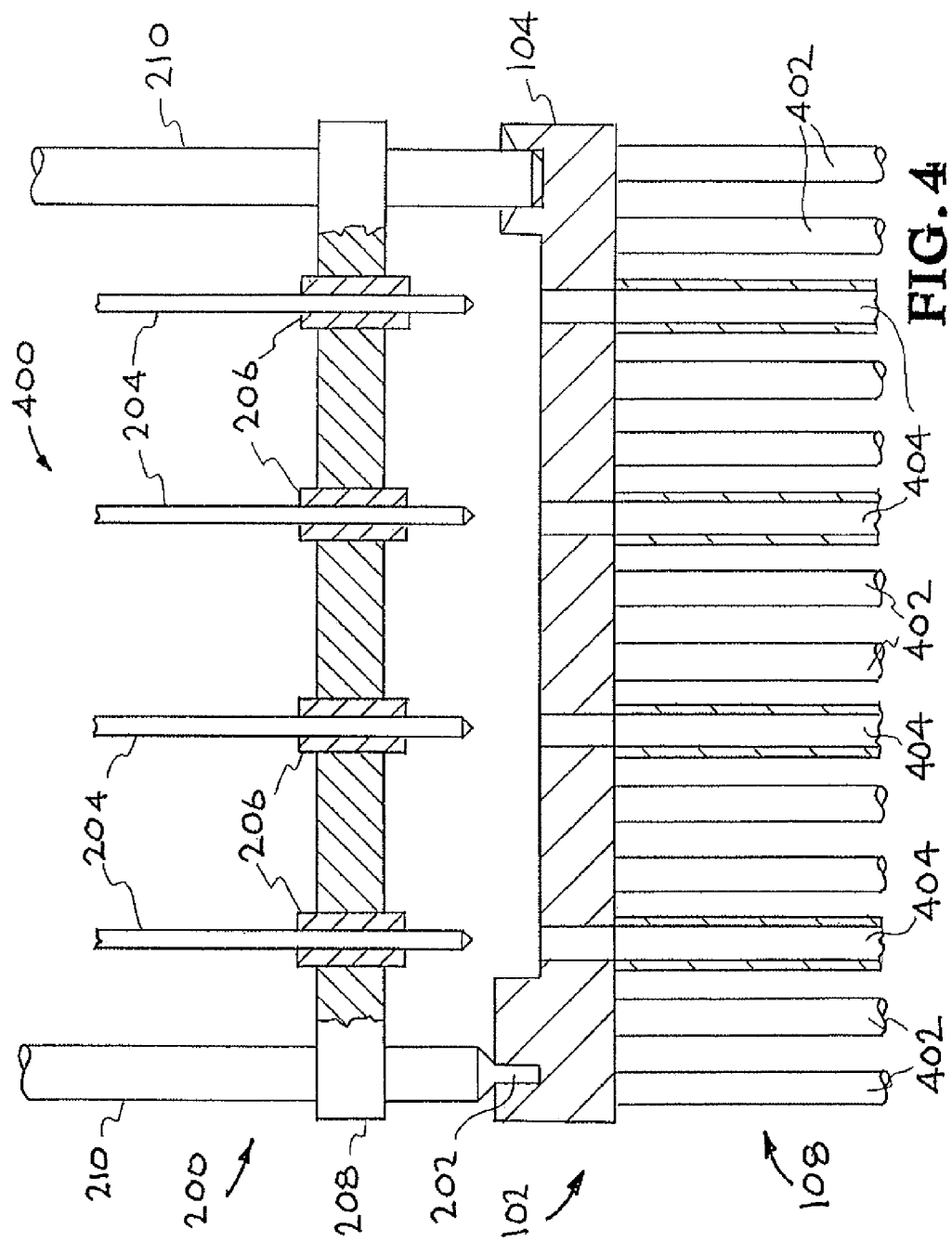
FIG. 4 illustrates the insertion fixture over a spent fuel assembly.

FIG. 4 is a partial cross sectional view 400 of the insertion fixture 200 in place atop a spent fuel assembly 102. The spent fuel pin array 108 cross section is taken from the fuel lattice illustrated in FIG. 6. The section is taken along section Line A-A. The detector insertion tubes 204 will house the detectors which are not shown here. The detectors can be neutron or gamma detectors or a combination of both types of detectors.

Figure 5:
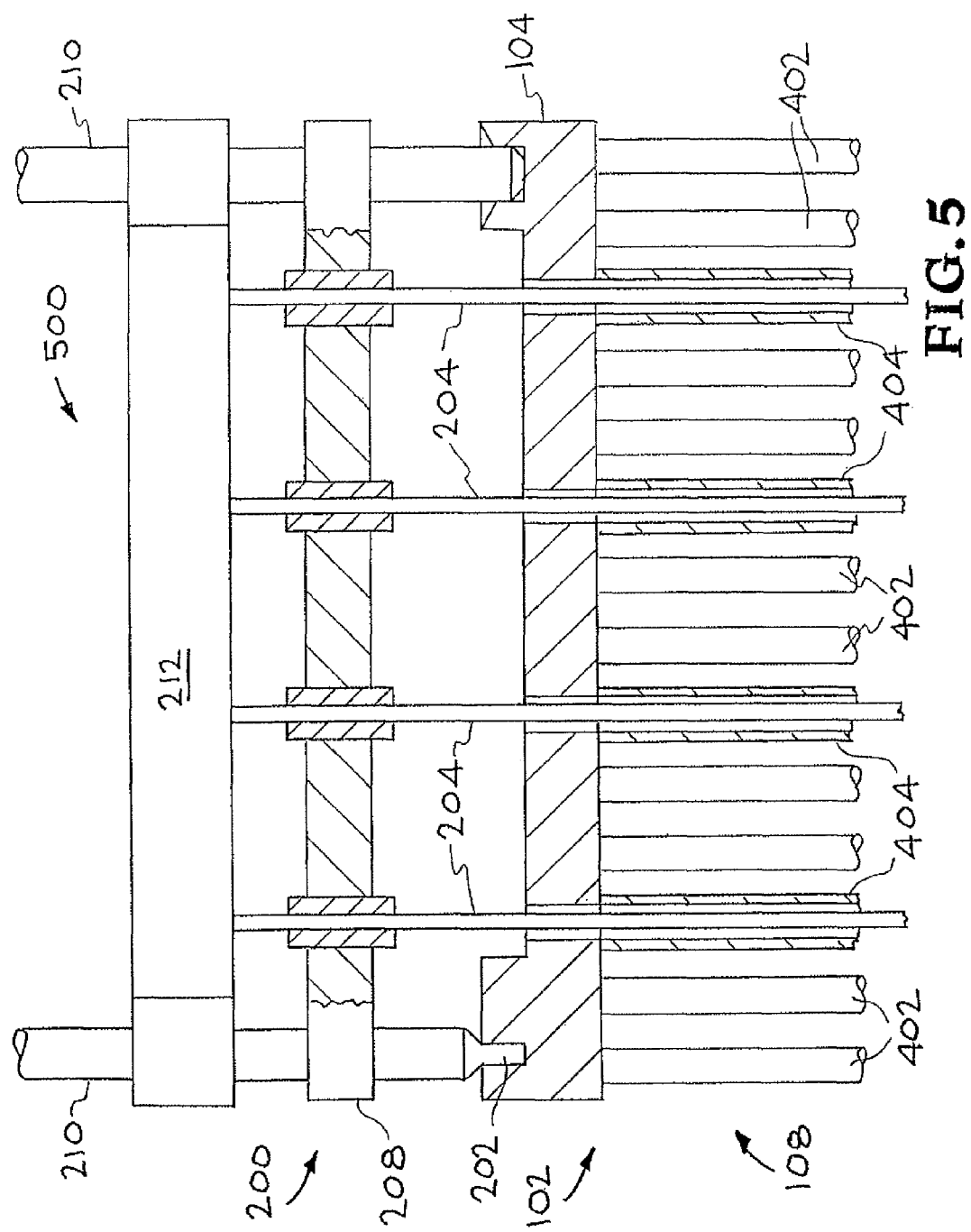
FIG. 5 is a partial cross sectional view of the insertion fixture in place atop a spent fuel assembly.

FIG. 5 is again a partial cross sectional view 500 of the insertion fixture 200 in place atop a spent fuel assembly 102. In this FIG. the slider assembly 212 has been moved downward thus moving the insertion tube 204 and the detectors contained within the tubes 204. The insertion tubes 204 are shown having entered the guide tubes 404. The slider assembly 212 can position the insertion tubes 204 with their detectors to different depths in the spent fuel array 108 to make multiple measurements.

Figure 6:
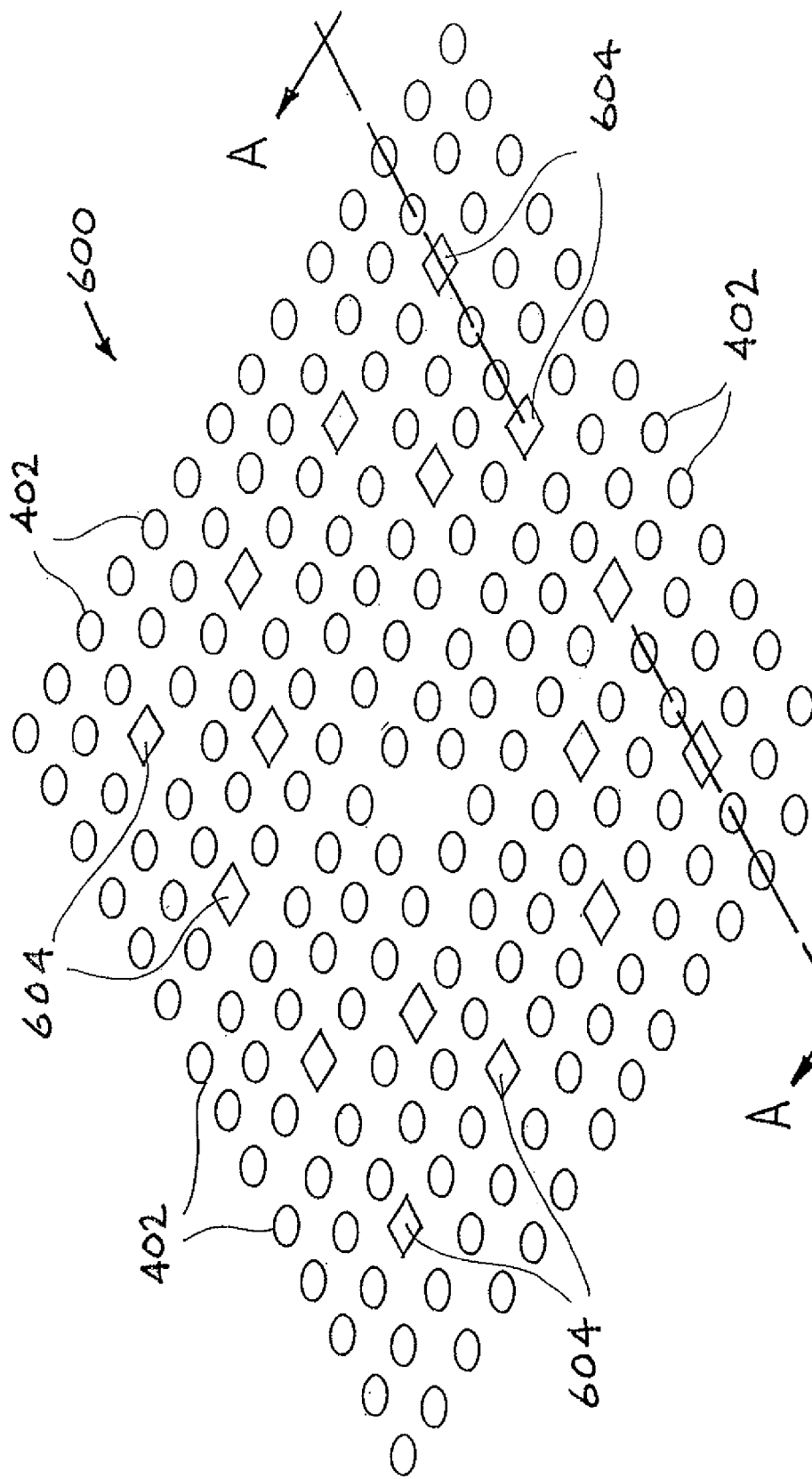
FIG. 6 is an illustration of a 14×14 array of spent fuel pins 402. Also shown are sixteen guide tubes 604 with the guide tubes 604 laid out in a symmetrical pattern.

FIG. 6 is an illustration of fuel lattice with guide tubes 602 locations. The fuel lattice shown here in FIG. 6 is a 14×14 array, with sixteen guide tubes 402 with the guide 402 tubes 602 laid out in a symmetrical pattern.

Figure 7:
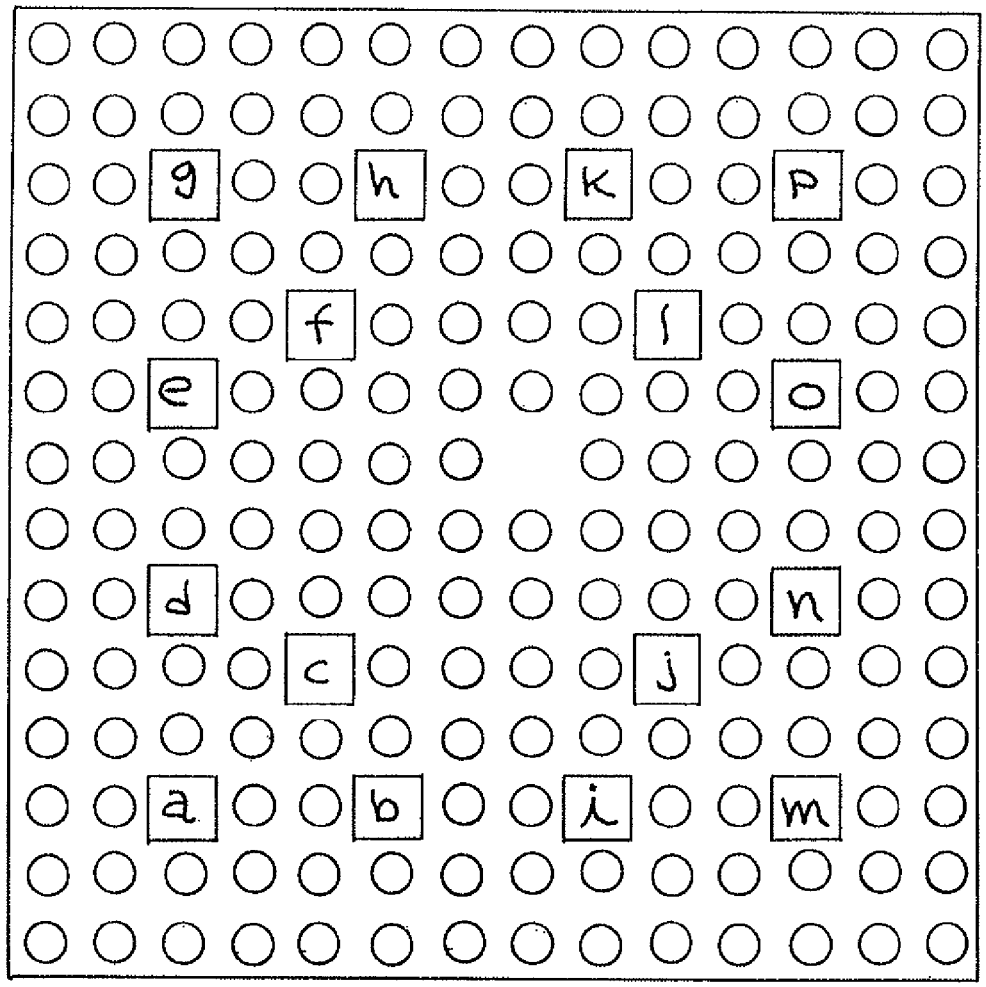
FIG. 7 shows a view of a 14×14 spent fuel array 108.

FIG. 7 is a view of a 14×14 spent fuel array 108. In FIG. 7 the cylindrical guide tubes (shown as 'a', 'b', 'c' etc.) 402 represent positions that have insertion tubes 204 with neutron or gamma or both types of detectors. The insertion fixture 200 can be repositioned atop the spent fuel array 108 by turning the insertion fixture 200 180°. In FIG. 7 the guide tubes 402 are shown with letters a thru p. The letters a thru p correspond to detectors that will be inserted into the guides to make measurement.

Figure 8C:
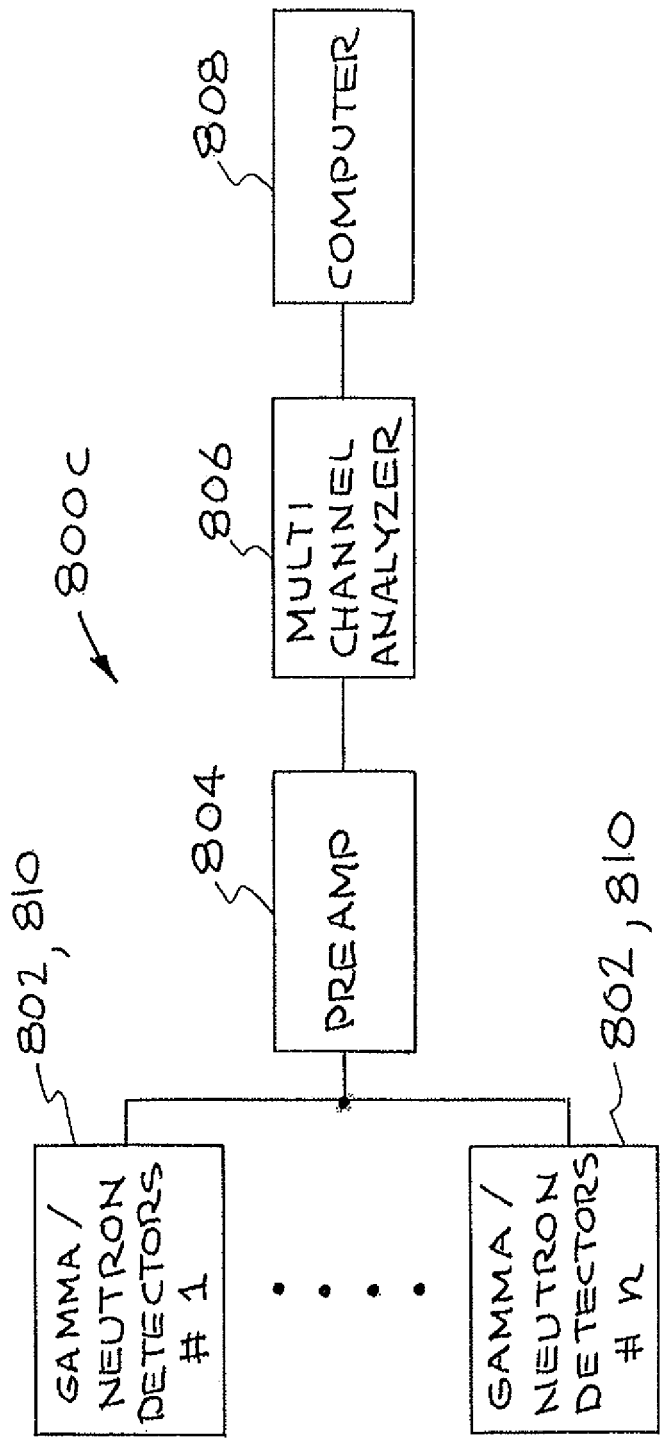

FIGS. 8A, 8B, and 8C are schematic representations of three possible arrangements of detectors and the associated apparatus used in collecting and analyzing the data obtained by using this invention.

FIG. 8A is a schematic 800A with neutron detectors 802. The signal from detectors 802 feeds to a preamp 804 then to a multi-channel analyzer 806, then to a computer 808 for data output.

FIG. 8B is a schematic 800B with gamma detectors 810. The signal from detectors 810 feed to pre amp 804 then to the multi channel analyzer 806 and on to the computer 808 for data output.

FIG. 8C is a schematic 800C with both neutron 802 and gamma 810 detectors. The signal again goes to the pre amp 804 and to analyzer 806 and to computer 808 for data output.

Figure 9:
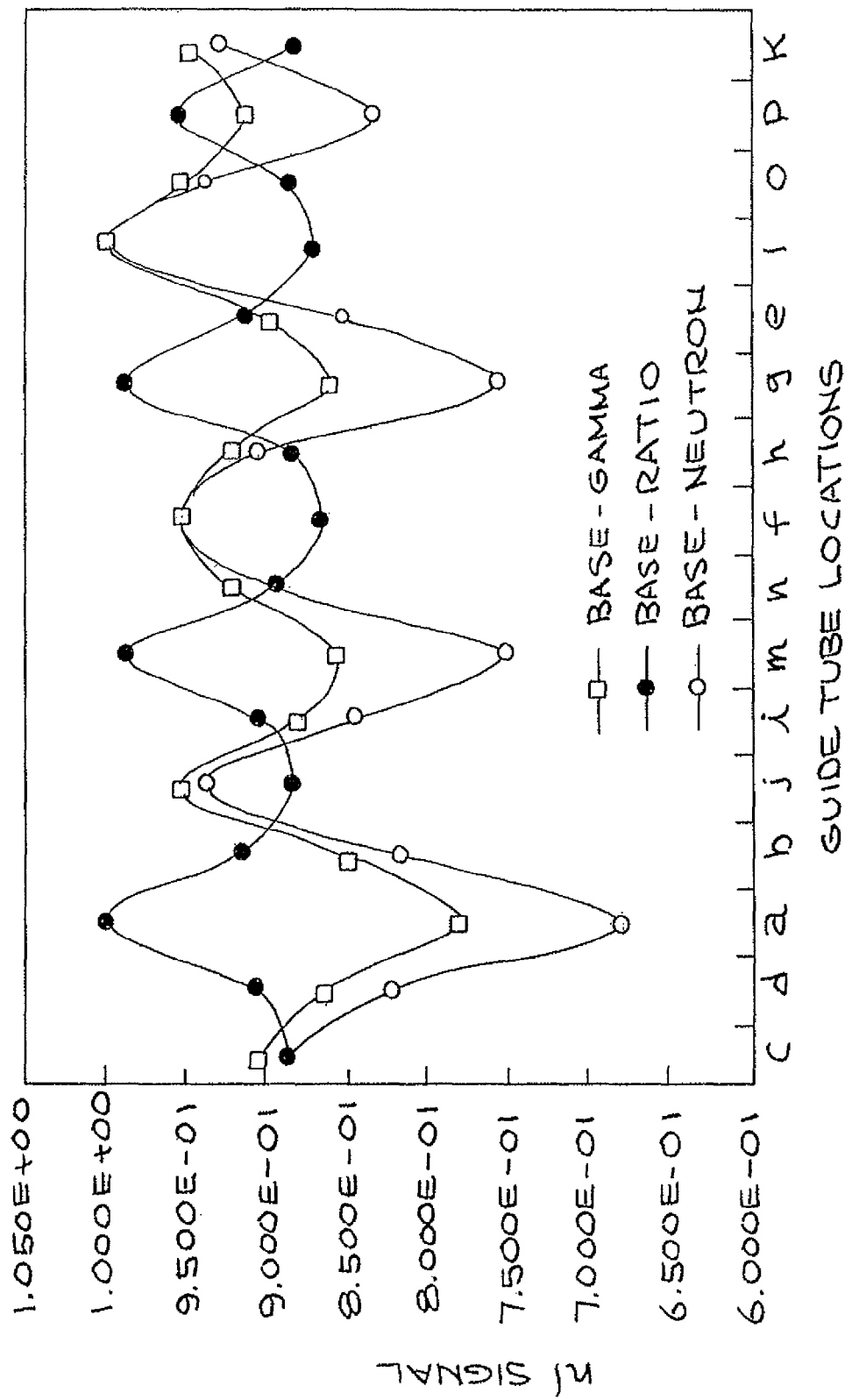
FIG. 9 is an example of Base Signatures from PDET.

The PDET tool uses the neutron (typically thermal neutrons), gamma, and ratio of gamma-to-neutron (typically thermal) signals from the guide tubes and normalizes them to the maximum among each set to form unique signatures that are primarily dependent on the geometric arrangement of the measurement locations (guide tubes) compared to other parameters. Spent fuel pools contain about 2000 ppm of boron dissolved in the water and assemblies are typically separated by borated aluminum slats in the storage racks for criticality safety reasons. Studies have shown that the boron content in the pool tilts the signature to some extent while still maintaining the unique geometry dependent shape. Contributions from neighboring assemblies depending on burnup gradients between them and the assembly where the measurement is being made (test assembly) also tend to tilt the base signature without altering the base shape of the signature. A set of base shapes for the normalized neutron, gamma, and gamma-to-neutron ratios are shown in FIG. 9 and constitute signatures that would be obtained by PDET when an assembly is intact. Removal of fuel pins from an assembly constitutes a partial defect and detection of partial defects is an important aspect of International Safeguards Criteria to prevent clandestine removal of fissile material. Studies on the PDET methodology indicate that as low as 10% missing fuel from an assembly can be visually detected by examining the distortion of the base signature. This far exceeds the detection threshold of 50% or more set by the IAEA Safeguards Criteria. The methodology also does not require any operator provided information and does not require the movement of fuel from its storage location, i.e. measurements are made in an in-situ condition. The base signature is maintained in an intact assembly with very little sensitivity to burnup, cooling time or initial enrichment. The concept envisions use of standard detectors already in use at the IAEA and a design that is portable for field applications.

These features of PDET are all unique and overcome limitation and disadvantages presented by currently used devices such as the Fork detector or the Cerenkov Viewing Device. Thus, this device that would fill an important need in the safeguards area for partial defect detection, a technology that the IAEA has been seeking for the past few decades.

Normalized Gamma-to-Thermal Neutron Ratio

The normalized signature presented by the ratio of the gamma-to-thermal neutron, the primary signature of interest, was examined extensively in various simulation studies. The signature itself is established by plotting the normalized values of the ratio starting with an inner guide tube location and moving in a counter clockwise manner e.g. 'c', 'd', 'a', 'b', etc. This produces a smoothly varying pattern with peaks at the peripheral locations and valleys at the central locations. This is because the gamma and neutron populations are the lowest at the periphery though owing to the greater variation between peak and valley in the neutron signal, the ratio is a mirror image of the individual normalized signals (See FIG. 9).

Figure 10:
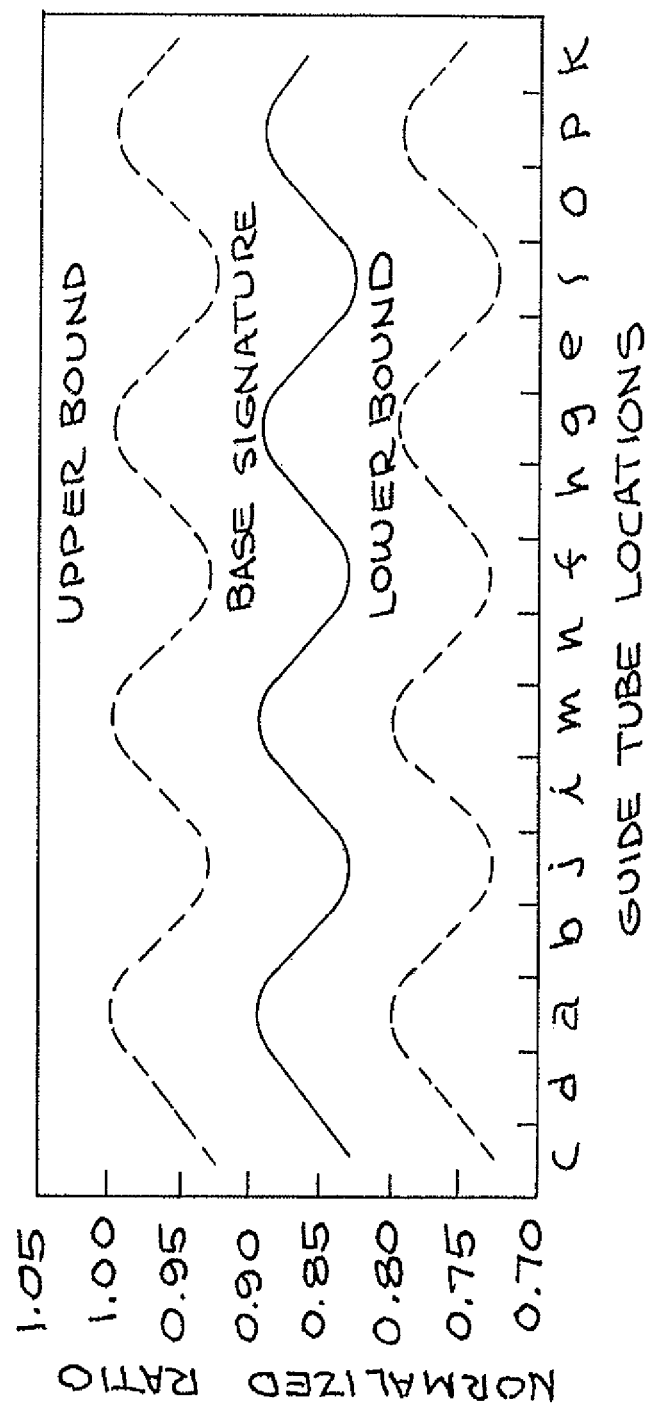
FIG. 10 shows the base signature with the upper and lower bounds.

Multi-assembly configurations with both uniform burnup assemblies as well as assemblies with large intra-assembly burnup profiles were simulated. Additional sensitivity studies with variable boron concentrations, cooling times and initial enrichments were also examined. As a result of these studies it was possible to establish an upper and lower bound of the base signature of the ratio. This variation was about ±0.1 about the mean with the constraint that the peak can be a maximum of 1.0. FIG. 10 shows the base signature for the ratio with the upper and lower bounds (dotted lines).

Figure 11:
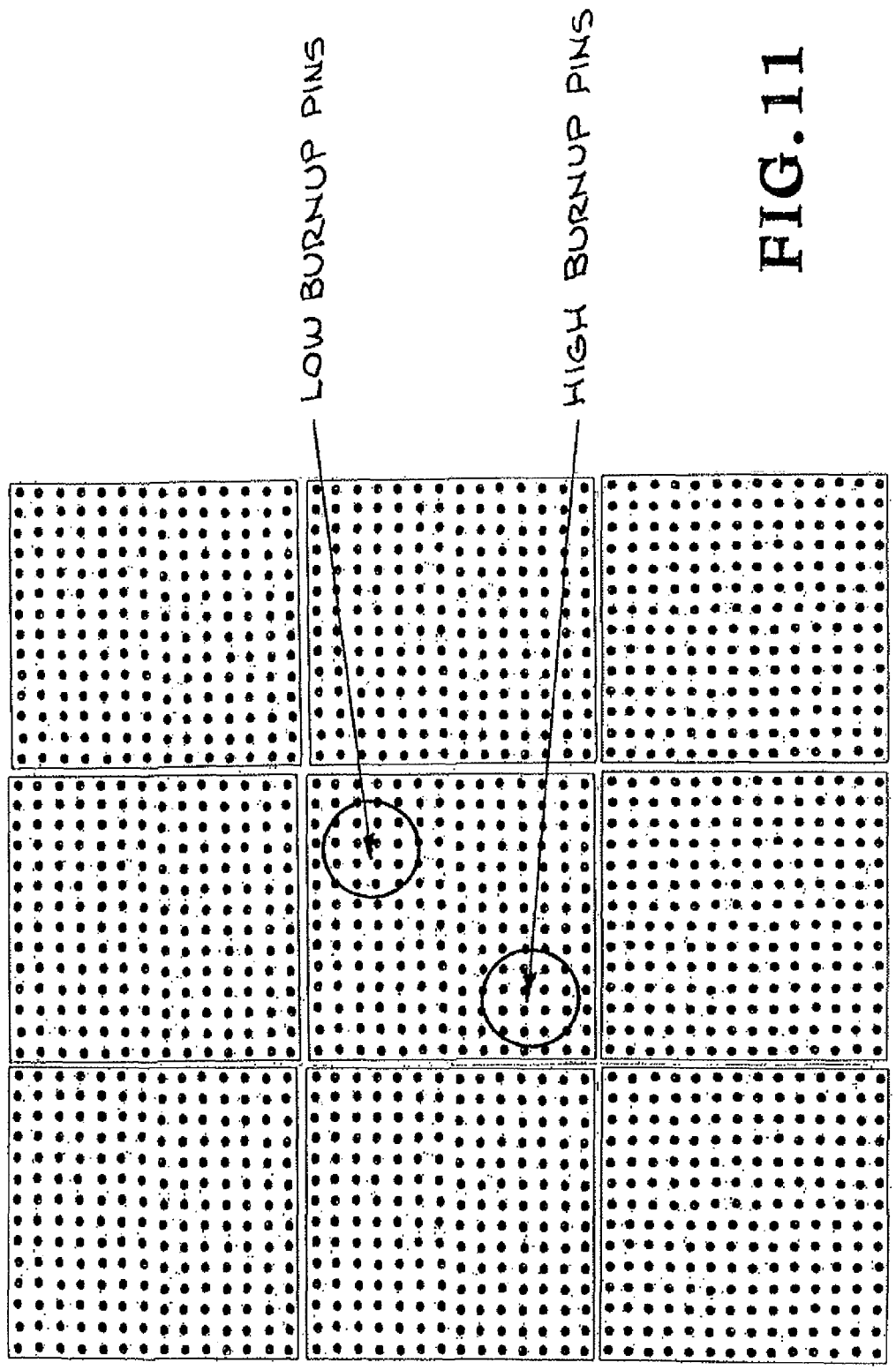
FIG. 11 shows a 3×3 array of assemblies with the central assembly among the nine being the test assembly, i.e. where the measurements would be made.
Figure 12B:
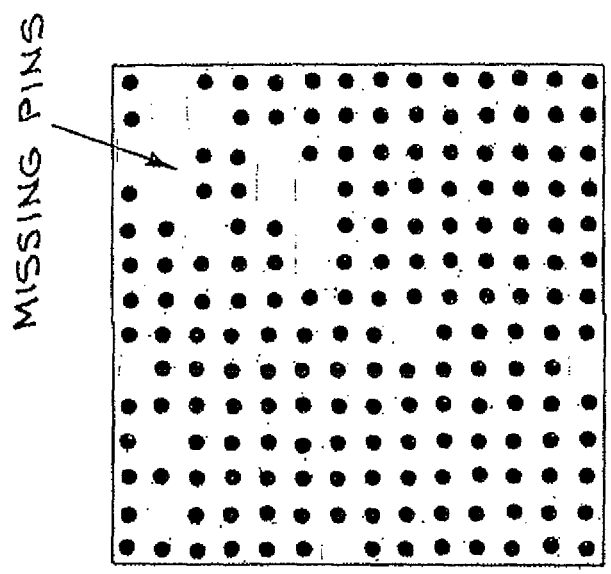
FIGS. 12 A & 12B show two scenarios of the test assembly where 22 pins have been removed.
Figure 12A:
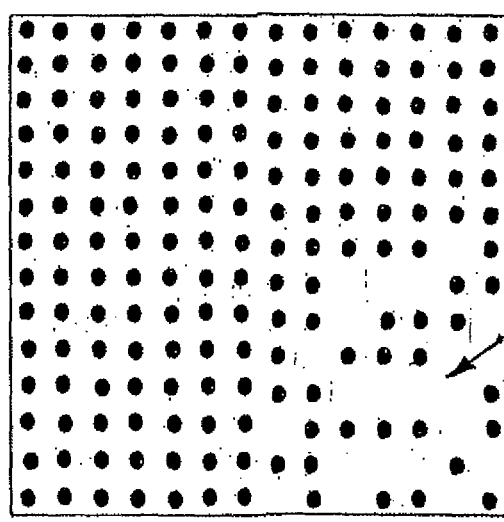
Figure 13:
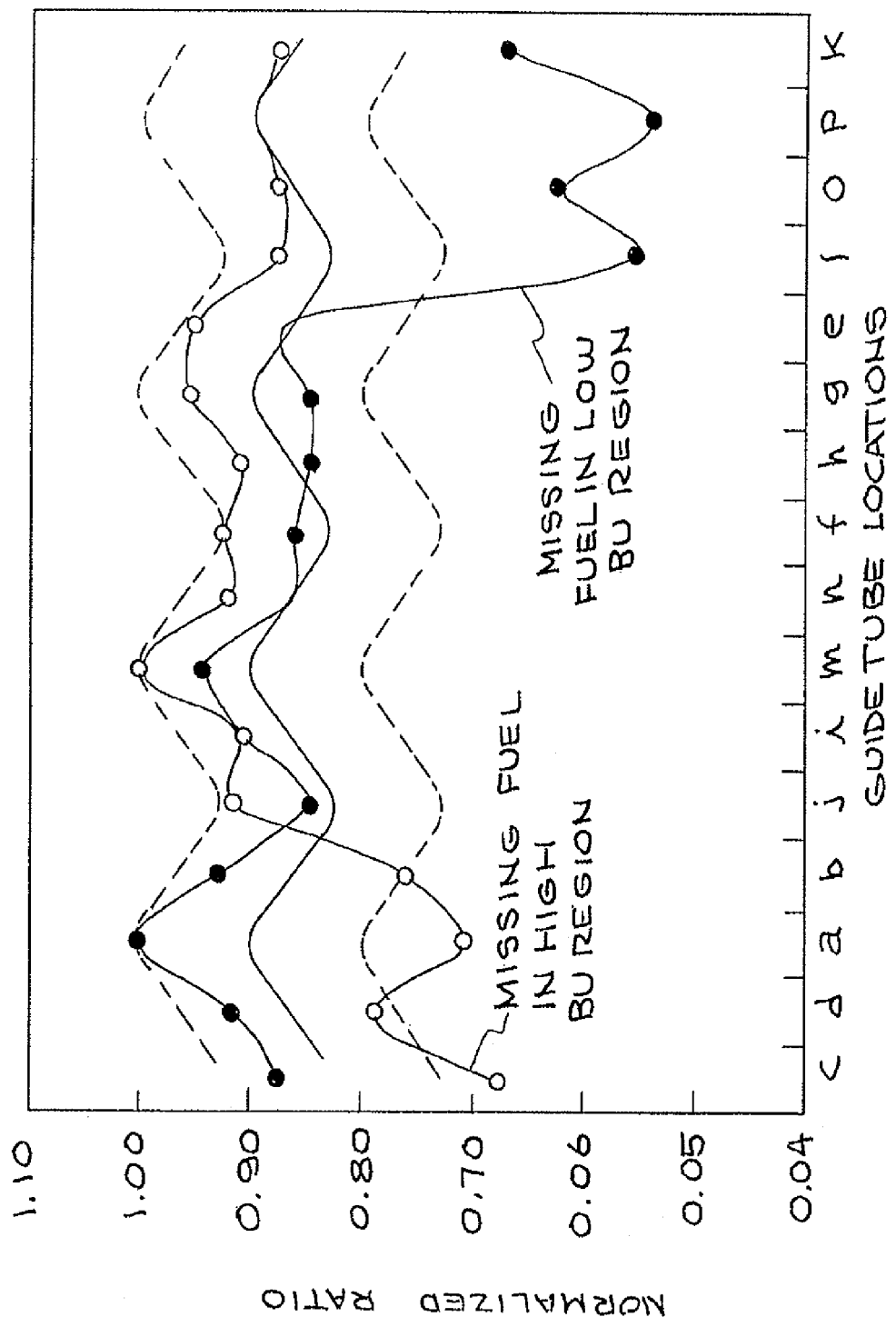
FIG. 13 shows the variation of the ratio signature as a result of the two diversion scenarios.

FIG. 11 shows a 3×3 array of assemblies with the central assembly among the nine being the test assembly, i.e. where the measurements would be made. These assemblies have a significant burnup gradient from one corner to the diagonally opposite one-27 MWd/kg to 37 MWD/kg. FIGS. 12 A & 12B show two scenarios of the test assembly where 22 pins have been removed. This represents 12% of the total number of fuel pins in the assembly. In one of the cases the cluster of missing pins is in the high burnup region and in the other it is in the low burnup region. FIG. 13 shows the variation of the ratio signature as a result of these two diversion scenarios clearly showing the deviation from the base case of an intact assembly. FIG. 13 is a graph showing missing pin signatures in the test assembly.

The gamma signal drops in the vicinity of the missing pins mainly due to the loss of the local source of gammas. The drop in the gamma signal contributes to the drop in the relative ratio to a large extent. There is an increase in the thermal neutron population at the locations in the low burnup region in the vicinity of missing pins because of the migration of neutrons from the high burnup regions that are intact as well as the lack of fuel to absorb the thermal neutrons. For the case of missing pins in the high burnup region, there is a slight increase in the locations surrounded by a few missing pins (e.g., location 'a' with six pins missing) for reasons just discussed. The impact on the neutron population is smaller in the high burnup regions with missing pins unless a very large number of the high burnup pins is missing. The deviation of the perturbed signature from the base signature is attributable in addition to the drop in the gamma signal, also to an increase in the neutron signal in the vicinity of the missing pins. The surrounding assemblies have a larger influence on the change in the magnitude of the neutron signal than they do on the more localized gamma signal.

A combination of the drop in the gamma signal combined with increases in the thermal neutron signal makes the relative ratio in the signature drop, leading to an overall change of shape in the signature that can be visually detected.

Figure 14:
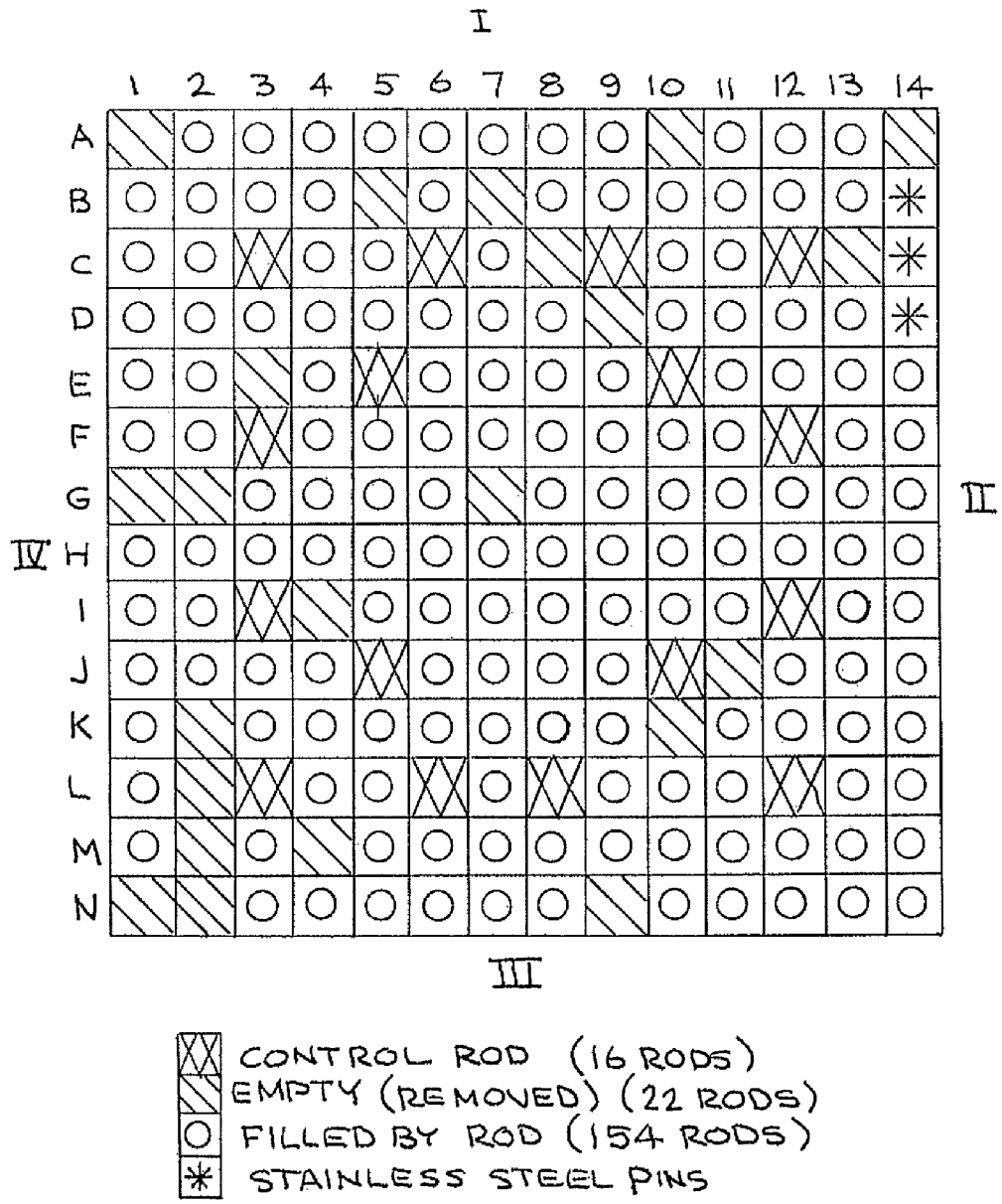
FIG. 14 shows missing fuel in an assembly.

The simulations were benchmarked against measurements at the Korea Atomic Energy Institute's spent fuel pool that contained assemblies with missing fuel. One of the assemblies where measurements were made was one which had missing fuel dispersed all over the assembly. FIG. 14 shows the missing fuel in this assembly that had a burnup gradient of 20 MWd/kg in one corner compared to 40 MWd/kg at the diagonally opposite corner. FIG. 14 is an illustration showing an assembly with dispersed missing fuel.

Figure 15:
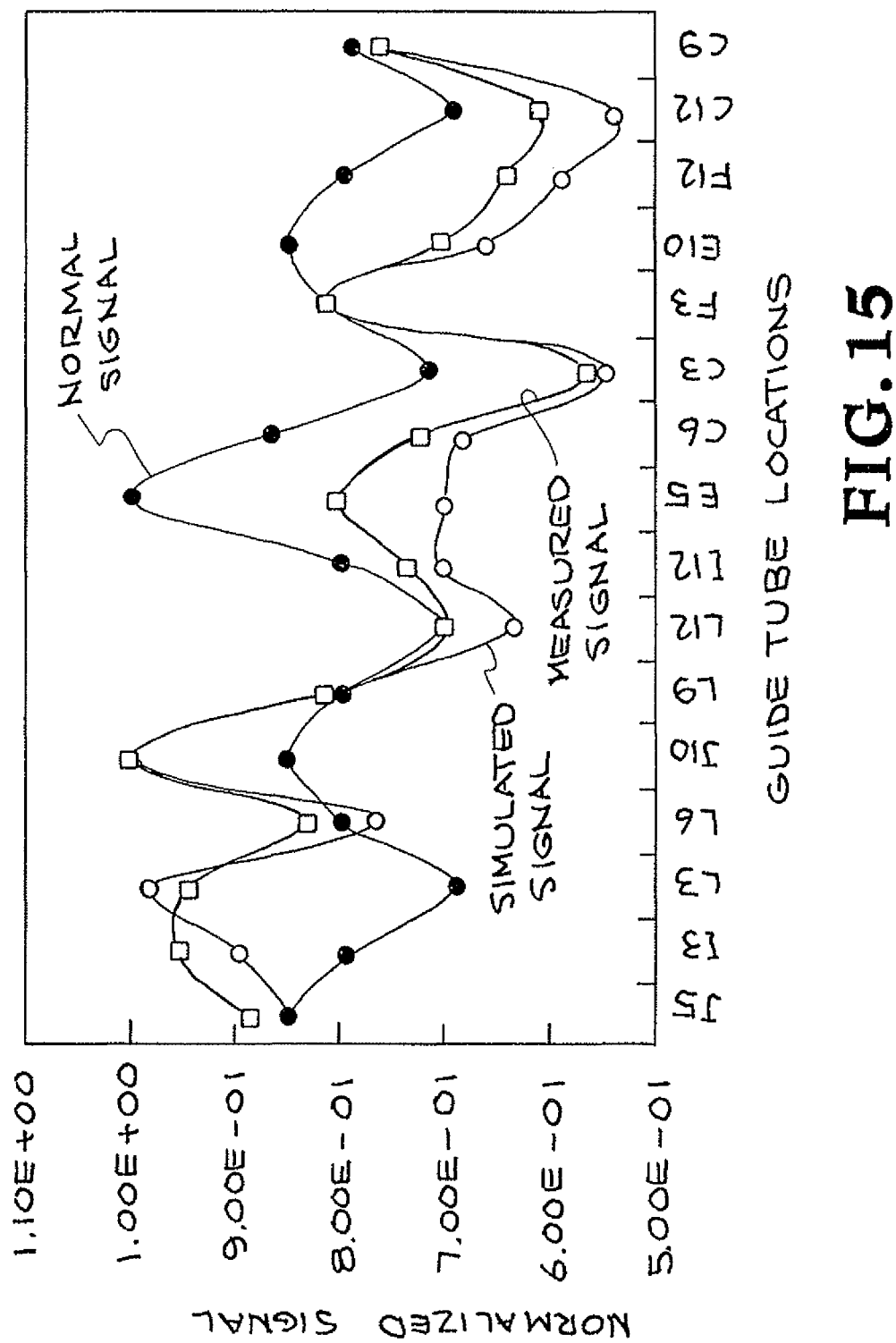
FIG. 15 is a graph showing gamma-thermal neutron ratio signatures from the case with dispersed missing fuel.

The normalized ratio signature of this assembly is shown in FIG. 15. FIG. 15 is a graph showing signatures from the case with dispersed missing fuel. This figure includes the base signature as well as the measured and simulated signatures for this assembly with partial defects. The guide tube designations in this plot correspond to that shown in FIG. 14, i.e. J5, 13 etc. The deviation of the signature from the base case is clearly seen in FIG. 15. The measurement and simulation agree well as can be seen in FIG. 15. This case represented 25 missing pins (22 empty slots and 3 slots with dummy pins represented by stars in FIG. 14) amounting to about 14% diversion from the assembly.

Normalized Neutron Signature

Figure 16:
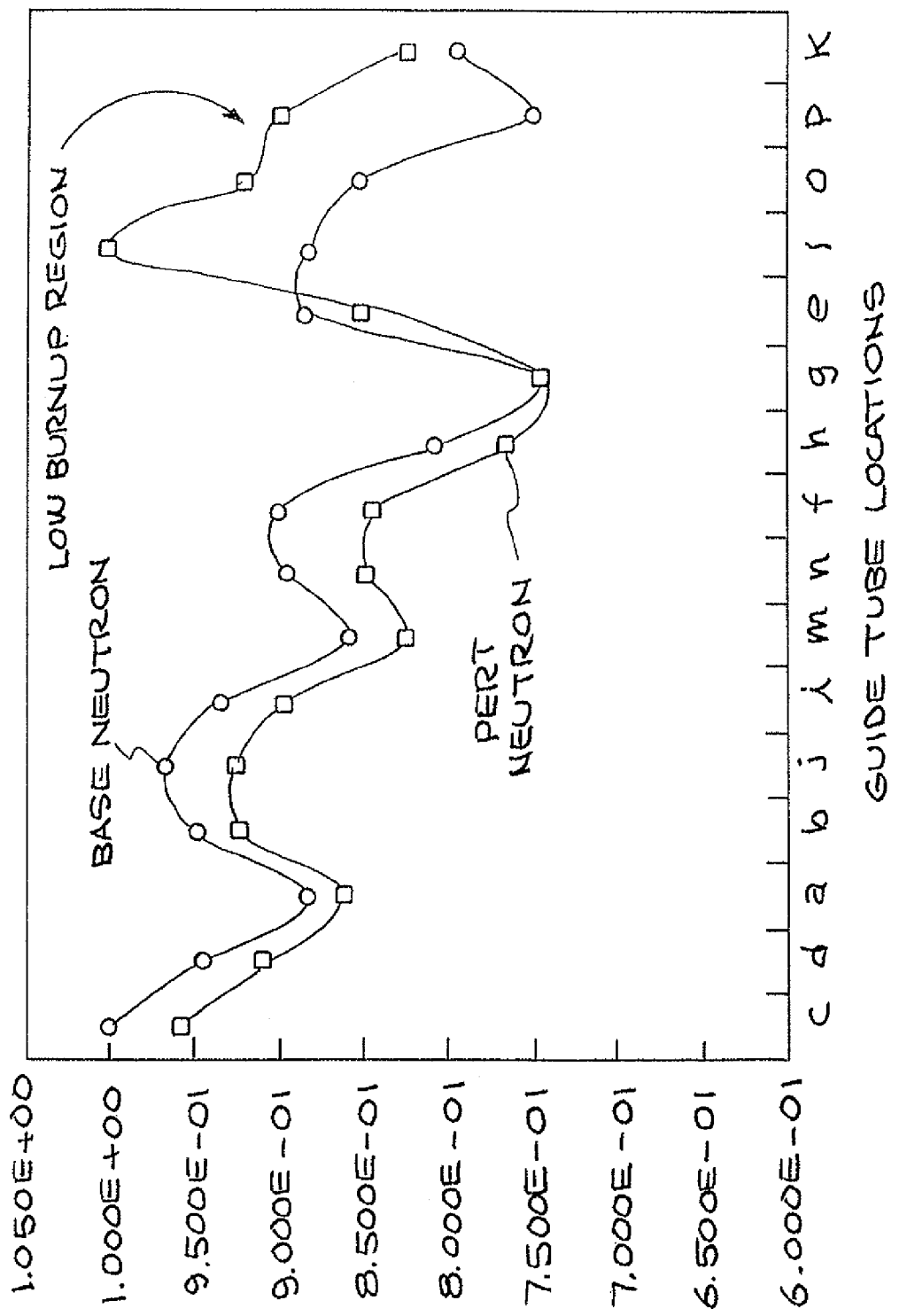
FIG. 16 is a graphs showing neutron signature for 12% missing fuel.

In addition to the ratio, the normalized neutron signature can also indicate pin diversion. The normalized neutron signature for the case with missing fuel in the low burnup region as shown in FIG. 12 is shown in FIG. 16. FIG. 16 is a graph showing the neutron signature for 12% missing fuel.

FIG. 16 clearly shows that the thermal neutron flux has increased in the vicinity of the cluster of empty slots (see FIGS. 12 A & 12B) as a result of increased thermalization in the water. FIG. 16 also shows a tilt in the base signature caused by the effect of the surrounding assemblies that feed neutrons into the low burnup regions thus increasing the population.

Figure 17:
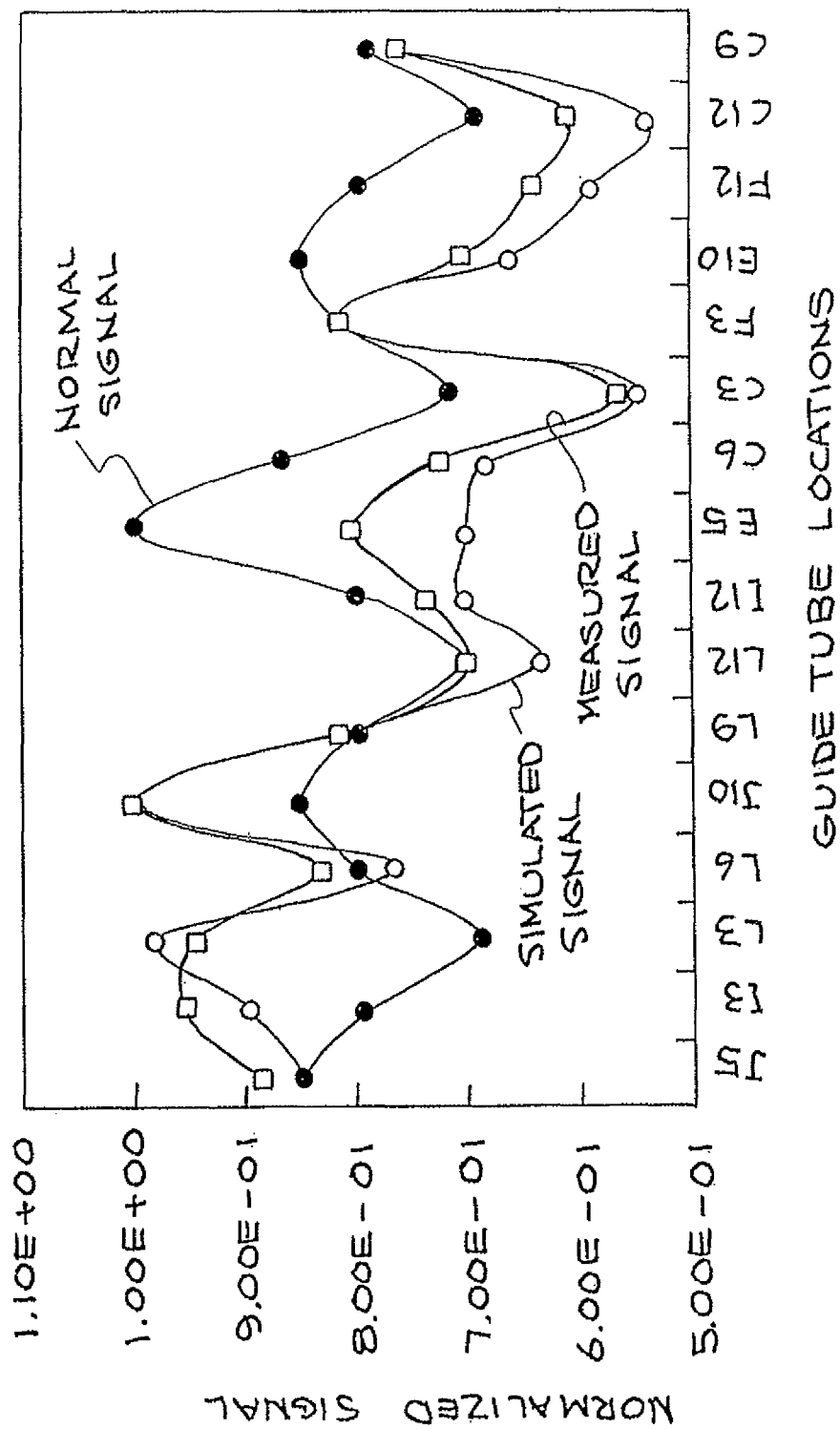
FIG. 17 is a graph showing for dispersed missing fuel neutron signature.

The neutron signature for the case corresponding to FIG. 14 is shown in FIG. 17. FIG. 17 is a graph showing for dispersed missing fuel neutron signature. Once again deviations are seen in the signature when compared to the base case.

Normalized Gamma Signatures

Figure 18:
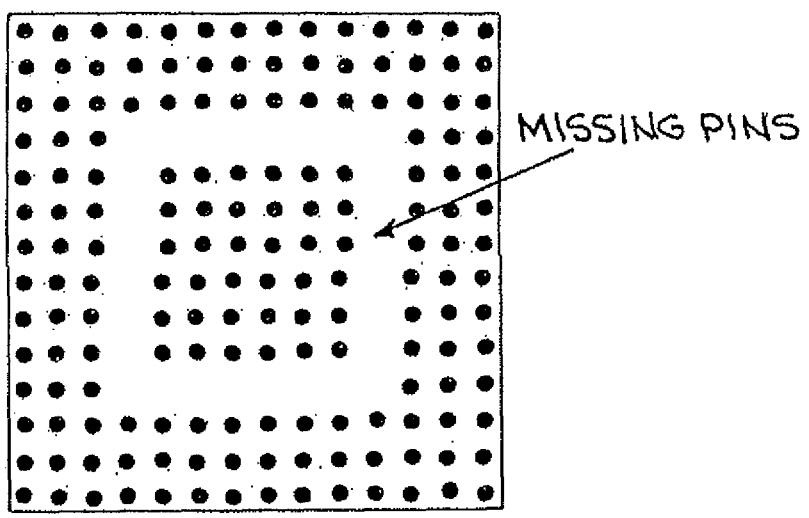
FIG. 18 shows the case of an isolated assembly with a burnup distribution that varies from 27-37 MWd/kg with a symmetric set of 28 pins removed around the center.

Since the signatures are symmetric in nature primarily based on the layout of the guide tubes, the issue of symmetric pin diversion needs to be examined. The gamma signature based on the more localized nature of the gamma signal is particularly useful for symmetric pin diversion detection. FIG. 18 shows the case of an isolated assembly with a burnup distribution that varies from 27-37 MWd/kg with a symmetric set of 28 pins removed around the center. This represents about 16% pin diversion from this assembly.

Figure 19:
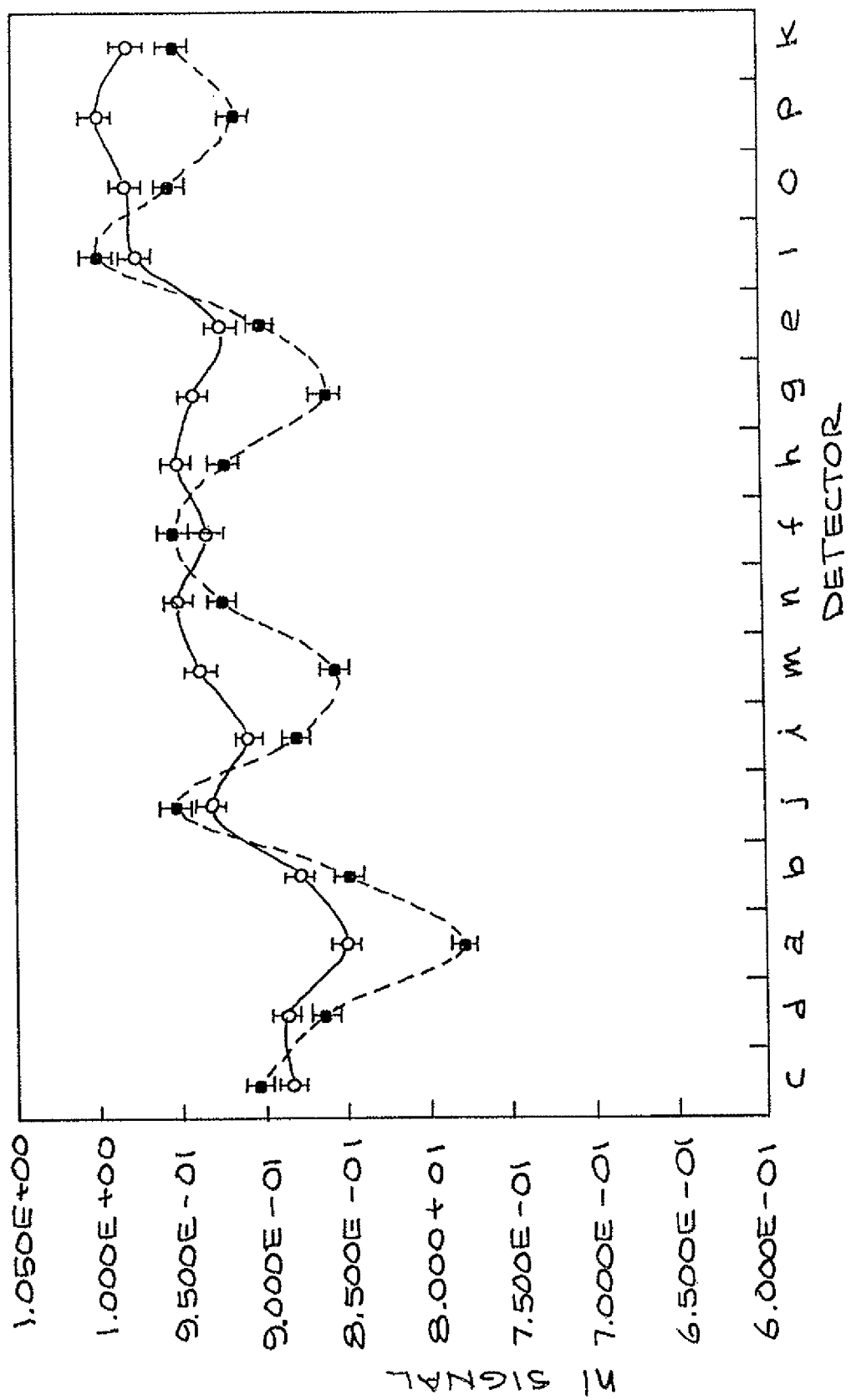
FIG. 19 is a graph showing a comparison of gamma signatures with 28 missing pins in a symmetric pattern.

FIG. 19 shows the normalized gamma signature compared to the base signature. FIG. 19 is a graph showing a comparison of signatures with 28 missing pins in a symmetric pattern. The gammas signal is localized since they get absorbed in the high Z, high density fuel and do not travel very far. However, given the pattern of missing fuel in FIG. 18, relatively larger numbers are able to reach the periphery increasing the gamma signals there. Thus, the normally depressed relative signal at the peripheral locations is now higher and that at the central locations is depressed leading to the signature being almost a mirror image of the base signature. The diversion can be seen clearly from examining the perturbed signature compared to the base (dotted line).

The neutron signature in this case did not exhibit any change in shape of the signature from the base since the pattern produces a symmetric thermalizing medium for the migrating neutrons keeping the relative population unchanged from the base.

Figure 20:
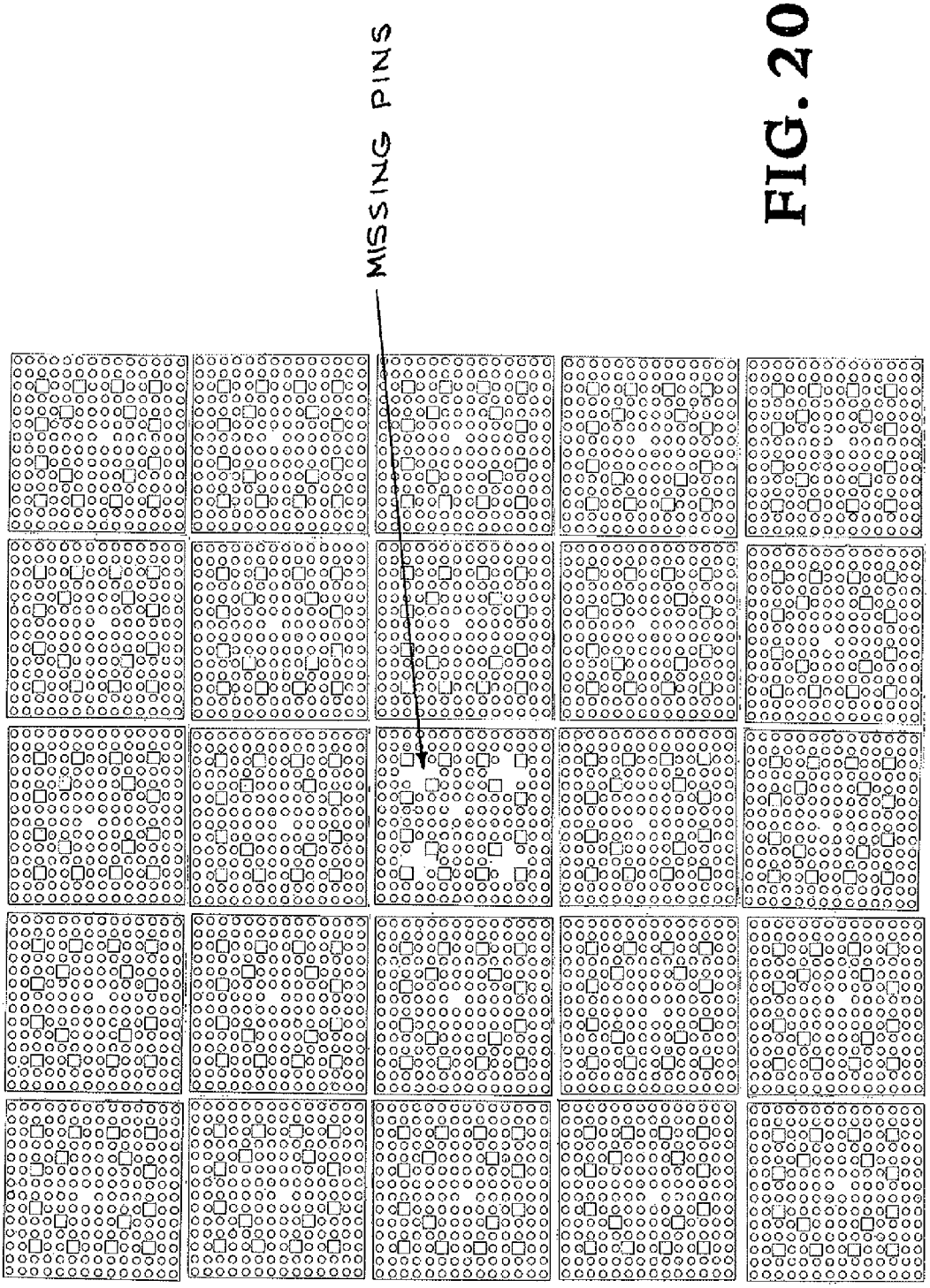
FIG. 20 shows twenty missing pins in a 5×5 array.

Symmetric pin diversion in a uniform burnup assembly (32 MWd/kg) surrounded by a checkerboard pattern of high (37 MWD/kg) and low (27 MWd/kg) burnups is shown in FIG. 20. FIG. 20 shows twenty missing pins in a 5×5 array. The diversion here consists of 20 missing pins (11% of total) in clusters of five symmetric about each set of 4 guide tubes.

Figure 21:
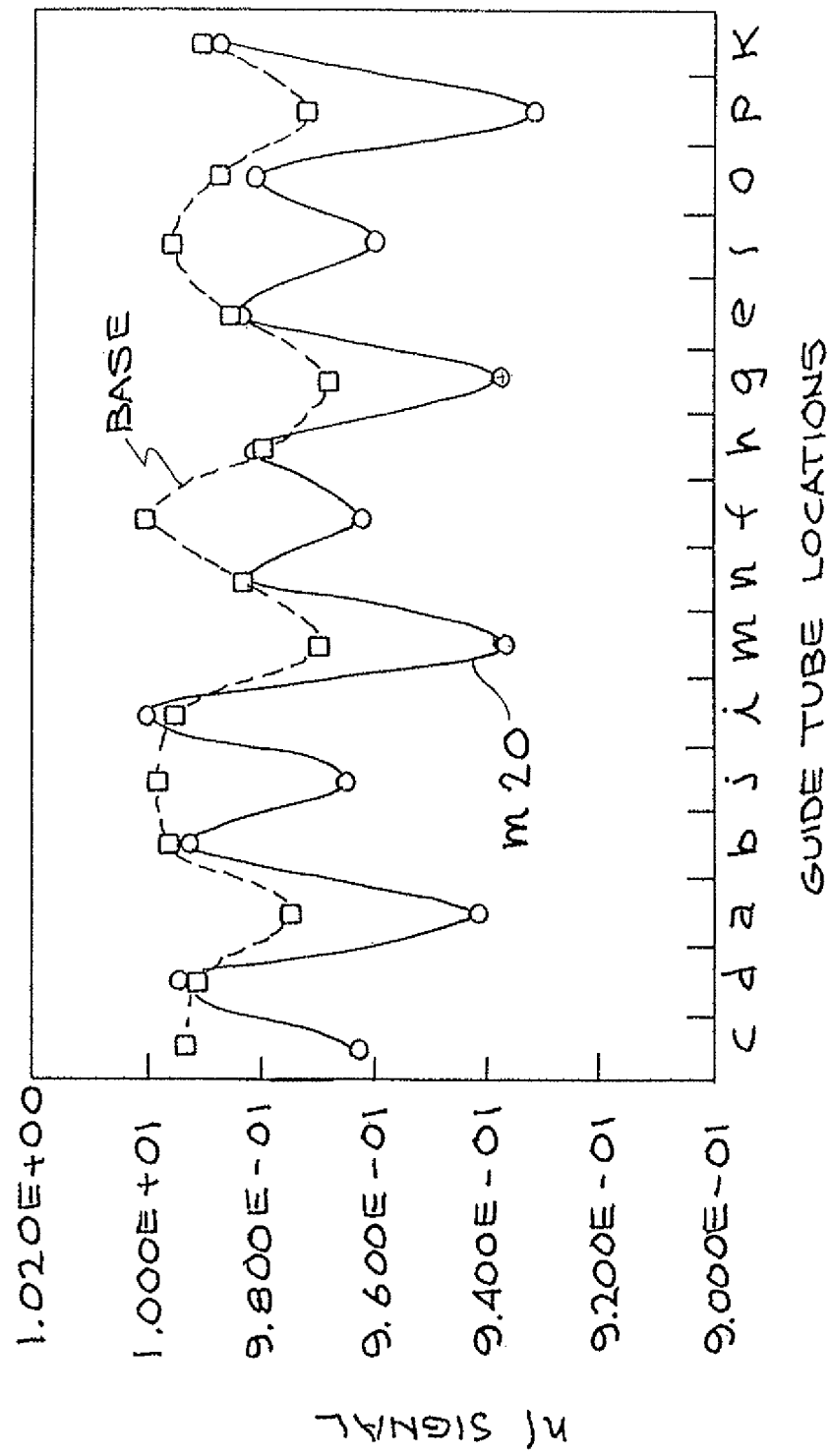
FIG. 21 is a graph showing gamma signature for 20 missing pins.

FIG. 21 shows the gamma signature from this symmetric case and it is clear that the perturbed signature is very different. FIG. 21 is a graph showing gamma signature for 20 missing pins. In this case, the corner and center locations in each cluster of four guide tubes have three adjacent pins missing. This makes the gamma signal lower than usual at the center locations. For the corner locations that normally see the lowest gamma signals the effect is magnified.

Once again because of the symmetric diversion, the neutron signal does not show any deviation from the base signature. The ratio plot is similar to the gamma plot.

The present invention provides methods and apparatus for detecting diversion of spent fuel from Pressurized Water Reactors (PWR). One embodiment provides a method of determining possible diversion of pins in a PWR spent fuel assembly having guide tube holes, including the steps of providing a detector cluster containing gamma ray detectors, inserting the detector cluster containing the gamma ray detectors into the spent fuel assembly through the guide tube holes in the spent fuel assembly, measuring gamma ray radiation responses of the gamma ray detectors in the guide tube holes, processing the gamma ray radiation responses at the guide tube locations by normalizing them to the maximum value among them and producing a signature based on these normalized values, and producing an output that consists of this signature that can indicate possible diversion of the pins from the spent fuel assembly. Another embodiment provides a method of determining possible diversion of pins in a PWR spent fuel assembly having guide tube holes, including the steps of providing a detector cluster containing neutron detectors, inserting the detector cluster containing the neutron detectors into the spent fuel assembly through the guide tube holes in the spent fuel assembly, measuring neutron radiation responses of the neutron detectors in the guide tube holes, processing the neutron radiation responses at the guide tube locations by normalizing them to the maximum value among them and producing a signature based on these normalized values, and producing an output that consists of this signature that can indicate possible diversion of the pins from the spent fuel assembly. Another embodiment provides a method of determining possible diversion of pins in a PWR spent fuel assembly having guide tube holes, including the steps of providing a detector cluster containing neutron detectors and gamma ray detectors, inserting the detector duster containing the neutron detectors and the gamma ray detectors into the spent fuel assembly through the guide tube holes in the spent fuel assembly, measuring neutron radiation responses and gamma ray radiation responses of the neutron detectors and the gamma ray detectors, processing the neutron radiation responses and the gamma ray radiation responses of the neutron detectors and the gamma ray detectors and determining whether pins are missing or have been replaced with dummy or fresh pins, and providing an output indicating possible diversion of the pins in the spent fuel assembly.

Another embodiment provides an apparatus for determining whether some fuel pins within PWR spent fuel assemblies are missing or replaced with dummy fuel rods, wherein the spent fuel assemblies have guide tube holes, including a cluster which contains neutron detectors or gamma detectors or neutron detectors and gamma detectors, the cluster inserted into the spent fuel assemblies through the guide tube holes in the spent fuel assemblies; and a measuring and analyzing device, the measuring and analyzing device measuring radiation responses of the detectors simultaneously at a location or multiple locations within the guide tube holes and processing the radiation responses and determining whether pins are missing or have been replaced with dummy or fresh pins.

Additional details of the present invention are described in the articles identified below. The article, "Monte Carlo Characterization of Pressurized Water Reactor Spent Fuel Assembly for the Development of a New Instrument for Pin Diversion", by Y. S. Ham, et al, Jun. 19, 2006, INMM06, Nashville, Tenn., Jul. 16, 2006 through Jul. 20, 2006. The article, "Development of a Safeguards Verification Method and Instrument to Detect Pin Diversion from Pressurized Water Reactor (PWR) Spent Fuel Assemblies", by Y. S. Ham, Oct. 16, 2006, Symposium on International Safeguards, Vienna, Austria, Oct. 16, 2006 through Oct. 20, 2006. The article, "Characterization of a Safeguards Verification Methodology to Detect Pin Diversion from Pressurized Water Reactor (PWR) Spent Fuel Assemblies using Monte Carlo Techniques," by S. Sitaraman and Y. S. Ham, 48th Annual Meeting of the Institute of Nuclear Materials Management, Tucson, Ariz., July 2007. The article, "Sensitivity Studies for an In-situ Partial Defect Detector (PDET) in Spent Fuel Using Monte Carlo Techniques", by S. Sitaraman and Y. S. Ham, INMM-49th Annual Meeting, Nashville, Tenn., Jul. 13, 2008 through Jul. 17, 2008. The article, "Symmetric Pin Diversion Detection using a Partial Defect Detector (PDET), by Shivakumar Sitaraman and Young S. Ham, INMM-50th Annual Meeting, Tucson, Ariz., Jul. 12, 2009 through Jul. 16, 2009. The article, "Y. S. Ham, S. Sitaraman, H. Shin, S. Eom, and H. Kim, "Experimental Validation of the Methodology for Partial Defect Verification in Pressurized Water Reactor Spent Fuel Assemblies", 50th Annual Meeting of the Institute of Nuclear Materials Management, Tucson, Ariz., July 2009. The articles identified above are incorporated in this patent application in their entirety for all purposes by this reference.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A detection apparatus that can determine whether spent nuclear fuel rods are missing or have been replaced with dummy spent nuclear fuel rods or have been replaced with fresh spent nuclear fuel rods, wherein the spent nuclear fuel rods are part of a spent nuclear fuel array located in a spent nuclear fuel storage pool, the spent nuclear fuel array having the spent nuclear fuel rods arranged in a quadrant symmetric pattern with guide tubes adjacent and between the spent nuclear fuel rods, comprising:
  a detection apparatus insertion fixture positioned in said spent nuclear fuel storage pool and adapted to contact the spent nuclear fuel array,
  said detection apparatus insertion fixture including a slider assembly with insertion tubes adapted to be inserted into the guide tubes in the spent nuclear fuel array,
  said insertion tubes moveable in the guide tubes of the spent nuclear fuel array by said slider assembly,
  a first detector and a second detector contained within the insertion tubes,
  wherein said first detector and said second detector are neutron detectors or gamma detectors and wherein said first detector and said second detector detect radiation responses, wherein the insertion tubes are between the spent nuclear fuel rods that are arranged in a quadrant symmetric pattern, wherein the insertion tubes containing said first detector and said second detector are inserted into the guide tubes adjacent the spent nuclear fuel rods and move through the guide tubes in the spent nuclear fuel array wherein said first detector and said second detector are in predetermined positions in the quadrant symmetric pattern;

a measuring and analyzing device, said measuring and analyzing device connected to said first detector and said second detector wherein said first detector and said second detector are located in predetermined positions in the quadrant symmetric pattern for measuring said radiation responses of said first detector and said second detector at the predetermined positions in the quadrant symmetric pattern simultaneously at said predetermined positions in the quadrant symmetric pattern and processing said radiation responses and producing a signature; and wherein said measuring and analyzing device uses said signature for determining whether some spent nuclear fuel rods within the spent nuclear fuel array in the spent nuclear fuel storage pool are missing or have been replaced with dummy spent nuclear fuel rods or have been replaced with fresh spent nuclear fuel rods using said signature by determining whether said signature has been perturbed from the quadrant symmetric pattern.

2. The detection apparatus of claim 1 wherein said first detector and said second detector are neutron detectors.

3. The detection apparatus of claim 1 wherein said first detector and said second detector are gamma detectors.

4. The detection apparatus of claim 1 wherein said first detector is a neutron detector and said second detector is a gamma detector.

5. The detection apparatus of claim 1 wherein said measuring and analysis device includes a multi-channel analyzer and a computer.

6. The detection apparatus of claim 1 wherein the spent nuclear fuel array has alignment holes and wherein said detection apparatus insertion fixture includes guide pins adapted to engage the alignment holes in the spent nuclear fuel array.

7. The detection apparatus of claim 1 wherein the spent nuclear fuel array has alignment holes and wherein said detection apparatus insertion fixture includes guide pins adapted to engage the alignment holes in the spent nuclear fuel array and guide bushings for the insertion tubes, wherein the insertion tubes are adapted to move in said guide bushings.

8. A detection system that can determine whether spent nuclear fuel rods are missing or whether some spent nuclear fuel rods have been replaced with dummy spent nuclear fuel rods or fresh spent nuclear fuel rods, the detection system comprising:

a spent nuclear fuel storage pool, a spent nuclear fuel array located in said spent nuclear fuel storage pool, said spent nuclear fuel array including the spent nuclear fuel rods arranged in a quadrant symmetric pattern and guide tubes adjacent and between the spent nuclear fuel rods, a detection apparatus insertion fixture adapted to be inserted into said spent nuclear fuel storage pool, said detection apparatus insertion fixture including a slider assembly with insertion tubes, said insertion tubes adapted to be moved in said guide tubes of said spent nuclear fuel array by said slider assembly in said spent nuclear fuel storage pool, wherein said insertion tubes contain a first detector and a second detector, wherein said first detector and said second detector are neutron detectors or gamma detectors and wherein said first detector and said second detector detect radiation responses, said insertion tubes are adapted to be inserted into said guide tubes adjacent the spent nuclear fuel rods in said spent nuclear fuel array through said guide tubes in said spent nuclear fuel array in predetermined positions in said quadrant symmetric pattern; and a measuring and analysis unit connected to said first detector and said second detector wherein said first detector and said second detector are located in predetermined positions in said quadrant symmetric pattern wherein radiation responses of said first detector and said second detector are simultaneously measured at a location or multiple locations within said guide tubes to produce a signature, and a processor for processing said radiation responses and said signature by determining whether said signature has been perturbed in said quadrant symmetric pattern and determining whether said spent nuclear fuel rods within said spent nuclear fuel array in said spent nuclear fuel storage pool are missing or have been replaced with dummy spent nuclear fuel rods or fresh spent nuclear fuel rods.

9. The detection apparatus of claim 8 wherein said first detector and said second detector are neutron detectors.

10. The detection apparatus of claim 8 wherein said first detector and said second detector are gamma detectors.

11. The detection apparatus of claim 8 wherein said first detector is a neutron detector and said second detector is a gamma detector.

12. The detection apparatus of claim 8 wherein said measuring and analysis unit includes a multi-channel analyzer and a computer.

13. A method of determining possible diversion of spent nuclear fuel rods located in a spent nuclear fuel storage pool in a spent nuclear fuel array in the spent nuclear fuel storage pool, wherein the spent nuclear fuel array includes spent nuclear fuel rods arranged in a fuel rods quadrant symmetric pattern and guide tubes adjacent and between the spent nuclear fuel rods, comprising the following steps:

the step of providing a detector instrument insertion fixture having a slider assembly with insertion tubes arranged in a detector quadrant symmetric pattern corresponding to the fuel rods quadrant symmetric pattern, said insertion tubes containing a first detector and a second detector, wherein said first detector and said second detector are gamma ray detectors and wherein said first detector and said second detector are in predetermined positions in said detector quadrant symmetric pattern, the step of moving said detector instrument insertion fixture into the spent nuclear fuel storage pool adjacent the spent nuclear fuel array in the spent nuclear fuel storage pool, the step of moving said slider assembly with said insertion tubes into contact with the spent nuclear fuel array in the spent nuclear fuel storage pool, the step of inserting said insertion tubes containing said gamma ray detectors of said first detector and said second detector into said guide tubes in the spent nuclear fuel array using said detector instrument insertion fixture, the step of measuring gamma ray radiation responses of said gamma ray detectors in said guide tubes, the step of processing said gamma ray radiation responses in said guide tubes by normalizing them to the maximum value among them and producing a signature based on these normalized values, and the step of producing an output that consists of said signature and determining whether said signature has been perturbed in said fuel rods quadrant symmetric pattern that can indicate possible diversion of said spent nuclear fuel rods from the spent nuclear fuel array in the spent nuclear fuel storage pool.

14. A method of determining possible diversion of spent nuclear fuel rods located in a spent nuclear fuel storage pool in a spent nuclear fuel array in the spent nuclear fuel storage pool, wherein the spent nuclear fuel array includes spent nuclear fuel rods arranged in a fuel rods quadrant symmetric pattern and guide tubes adjacent and between the spent nuclear fuel rods, comprising the following steps:

the step of providing a detector instrument insertion fixture having a slider assembly with insertion tubes arranged in a detector quadrant symmetric pattern corresponding to said fuel rods quadrant symmetric pattern, said insertion tubes containing a first detector and a second detector, wherein said first detector and said second detector are neutron detectors, the step of moving said detector instrument insertion fixture into the spent nuclear fuel storage pool adjacent the spent nuclear fuel array in the spent nuclear fuel storage pool, the step of moving said slider assembly with insertion tubes into contact with the spent nuclear fuel array in the spent nuclear fuel storage pool, the step of inserting said insertion tubes containing said neutron detectors of said first detector and said second detector into the guide tubes in the spent nuclear fuel array using said detector instrument insertion fixture, the step of measuring neutron radiation responses of said neutron detectors in said guide tubes, the step of processing said neutron radiation responses in said guide tubes by normalizing them to the maximum value among them and producing a signature based on these normalized values, and the step of producing an output that consists of said signature and determining whether said signature has been perturbed in said detector quadrant symmetric pattern that can indicate possible diversion of the spent nuclear fuel rods from the spent nuclear fuel array in the spent nuclear fuel storage pool.

15. A method of determining possible diversion of spent nuclear fuel rods located in a spent nuclear fuel storage pool in a spent nuclear fuel array in the spent nuclear fuel storage pool, wherein the spent nuclear fuel array includes spent nuclear fuel rods arranged in a fuel rods quadrant symmetric pattern and guide tubes adjacent and between the spent nuclear fuel rods, comprising the following steps:

the step of providing a detector instrument insertion fixture having a slider assembly with insertion tubes arranged in a detector quadrant symmetric pattern corresponding to the fuel rods quadrant symmetric pattern, said insertion tubes containing a first detector and a second detector, wherein said first detector is a neutron detector and said second detector is a gamma detector, the step of moving said detector instrument insertion fixture into the spent nuclear fuel storage pool adjacent the spent nuclear fuel array in the spent nuclear fuel storage pool, the step of moving said slider assembly with said insertion tubes into contact with the spent nuclear fuel array in the spent nuclear fuel storage pool, the step of measuring radiation responses, both gammas and neutrons, of said first detector and said second detector simultaneously at a location or multiple locations within said detector quadrant symmetric pattern, the step of determining ratios of the total gamma flux and neutron flux obtained at each measurement, the step of normalizing said ratios to the maximum among them to obtain a unique profile signature, and the step of determining wherein said unique profile signature has been perturbed in said detector quadrant symmetric pattern and determining whether spent nuclear fuel rods are missing or whether spent nuclear fuel rods have been replaced with dummy spent nuclear fuel rods using said unique profile signature in the spent nuclear fuel storage pool.

16. A method of determining possible diversion of spent nuclear fuel rods located in a spent nuclear fuel storage pool in a spent nuclear fuel array in the spent nuclear fuel storage pool, wherein the spent nuclear fuel array includes spent nuclear fuel rods arranged in a fuel rods quadrant symmetric pattern and guide tubes adjacent and between the spent nuclear fuel rods, comprising the following steps:

the step of providing a detector instrument insertion fixture having a slider assembly with insertion tubes arranged in a detector quadrant symmetric pattern corresponding to the fuel rods quadrant symmetric pattern, said insertion tubes containing a first detector and a second detector, wherein said first detector is a gamma detector and said second detector is a neutron detector, the step of moving said detector instrument insertion fixture into the spent nuclear fuel storage pool adjacent the spent nuclear fuel array in the spent nuclear fuel storage pool, the step of moving said slider assembly with said insertion tubes into contact with the spent nuclear fuel array in the spent nuclear fuel storage pool, the step of inserting said insertion tubes into said guide tubes in the spent nuclear fuel array in the spent nuclear fuel storage pool using said detector instrument insertion fixture, the step of measuring radiation responses, both gammas and neutrons, of said first detector and said second detector simultaneously at a location or multiple locations within said detector quadrant symmetric pattern, the step of determining ratios of the total gamma flux and neutron flux are obtained at each measurement, the step of normalizing said ratios to the maximum among them to obtain a unique profile signature, and the step of determining wherein said unique profile signature has been perturbed in said detector quadrant symmetric pattern and whether there are missing spent nuclear fuel rods or whether spent nuclear fuel rods have been replaced with dummy spent nuclear fuel rods in said spent nuclear fuel storage pool.

* * * * *

UNITED STATES PATENT AND TRADEMARK OFFICE
CERTIFICATE OF CORRECTION

PATENT NO. : 9,543,046 B2  
APPLICATION NO. : 12/619791  
DATED : January 10, 2017  
INVENTOR(S) : Young S. Ham et al.

Page 1 of 1

It is certified that error appears in the above-identified patent and that said Letters Patent is hereby corrected as shown below:

On the Title Page

Column one, item (75) Inventors, replace the text with the following:

(75) Inventors: Young S. Ham, Dublin, CA (US); Stephen P. Vernon, San Jose, CA (US)

Signed and Sealed this  
Eleventh Day of April, 2017

Michelle K. Lee  
*Director of the United States Patent and Trademark Office*